(12) United States Patent
Kudo et al.

(10) Patent No.: US 6,784,415 B2
(45) Date of Patent: Aug. 31, 2004

(54) METHOD OF INSTALLING A MULTI-BEAM PHOTOELECTRIC SAFEGUARD SYSTEM AND METHOD OF ADJUSTING ITS OPTICAL AXES

(75) Inventors: Motohiro Kudo, Osaka (JP); Tetsu Inoue, Osaka (JP)

(73) Assignee: Keyence Corporation, Osaka (JP)

( * ) Notice: Subject to any disclaimer, the term of this patent is extended or adjusted under 35 U.S.C. 154(b) by 179 days.

(21) Appl. No.: 10/231,015

(22) Filed: Aug. 30, 2002

(65) Prior Publication Data

US 2003/0052254 A1 Mar. 20, 2003

(30) Foreign Application Priority Data

Sep. 3, 2001 (JP) ........................................ 2001-265395

(51) Int. Cl.[7] .............................................. H01J 40/14
(52) U.S. Cl. ................................. 250/221; 250/559.12
(58) Field of Search .............................. 250/221, 222.1, 250/216, 559.12; 340/507, 555, 556; 356/73, 435

(56) References Cited

U.S. PATENT DOCUMENTS 6,414,603 B1 * 7/2002 Yamaguchi et al. ..... 340/815.4

* cited by examiner

Primary Examiner—Que T. Le
(74) Attorney, Agent, or Firm—Smith Patent Office

(57) ABSTRACT

A method of installing a multi-beam photoelectric safeguard system for making a light curtain of closely aligned light beams closely to a pressing machine first positions main light emitting and detecting devices (11, 12). The method next mounts a projecting portion (21) to the pressing machine and identifies optical axes interrupted by the projecting portion (21). Subsequently, after setting a sub light detecting device (13) adjacent to one side of the projecting portion (21), the method adjusts optical axes between the sub light detecting device (13) and the main light emitting device (11). Finally, after setting a sub light emitting device (14) adjacent to the other side of the projecting portion (21), the methods adjusts optical axes between the sub light emitting device (14) and the main light detecting device (12).

13 Claims, 18 Drawing Sheets

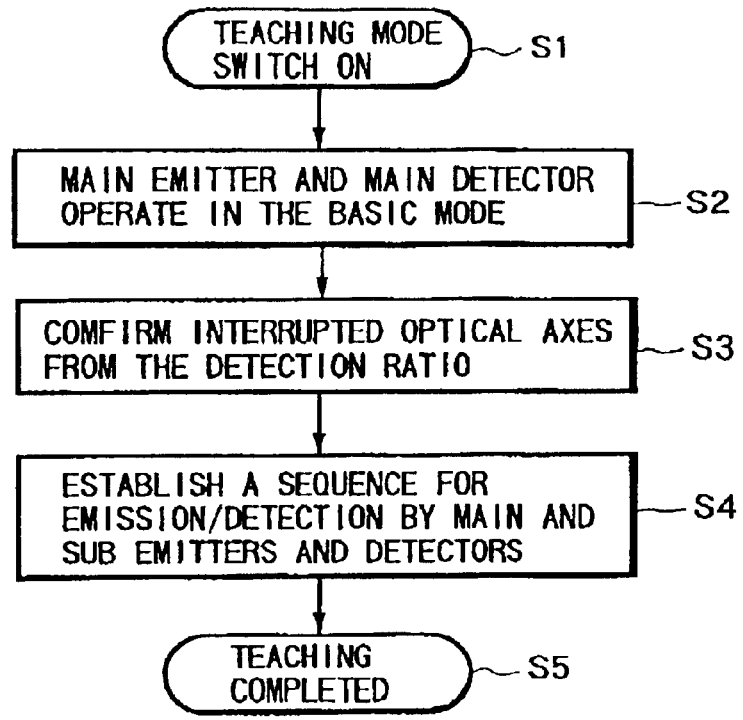
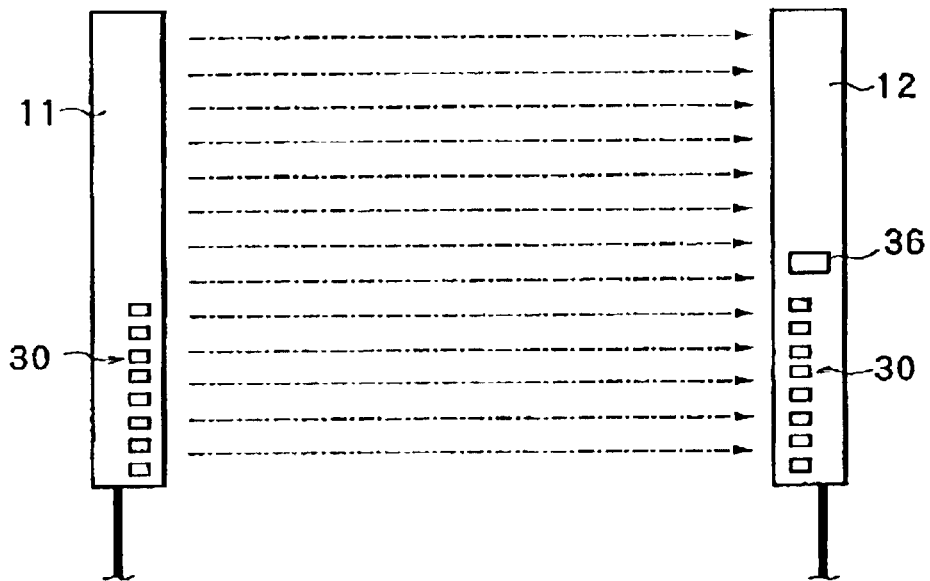

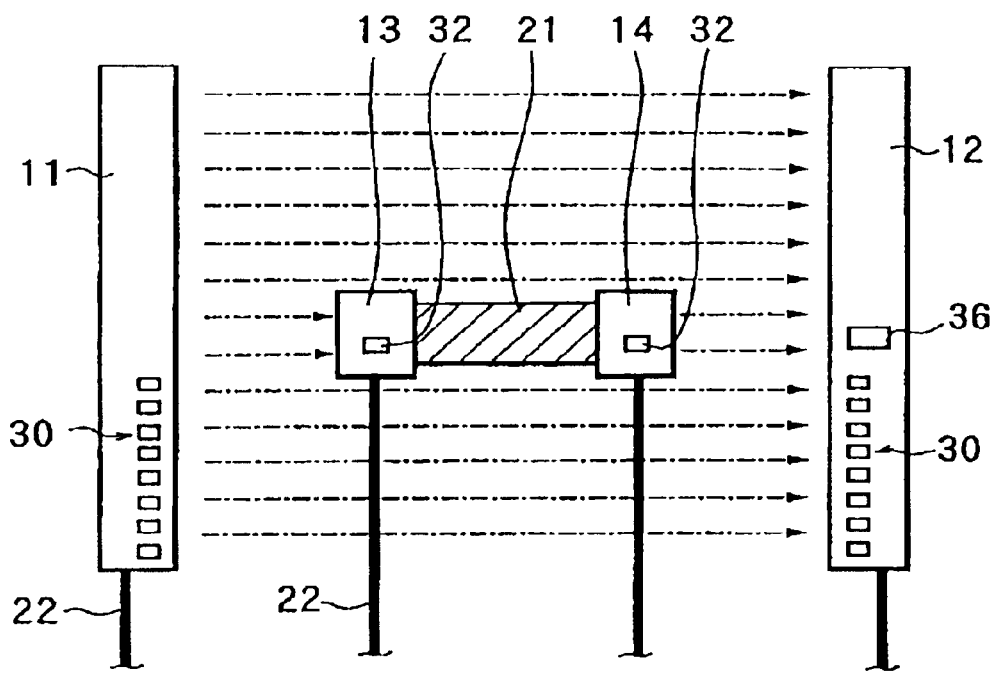
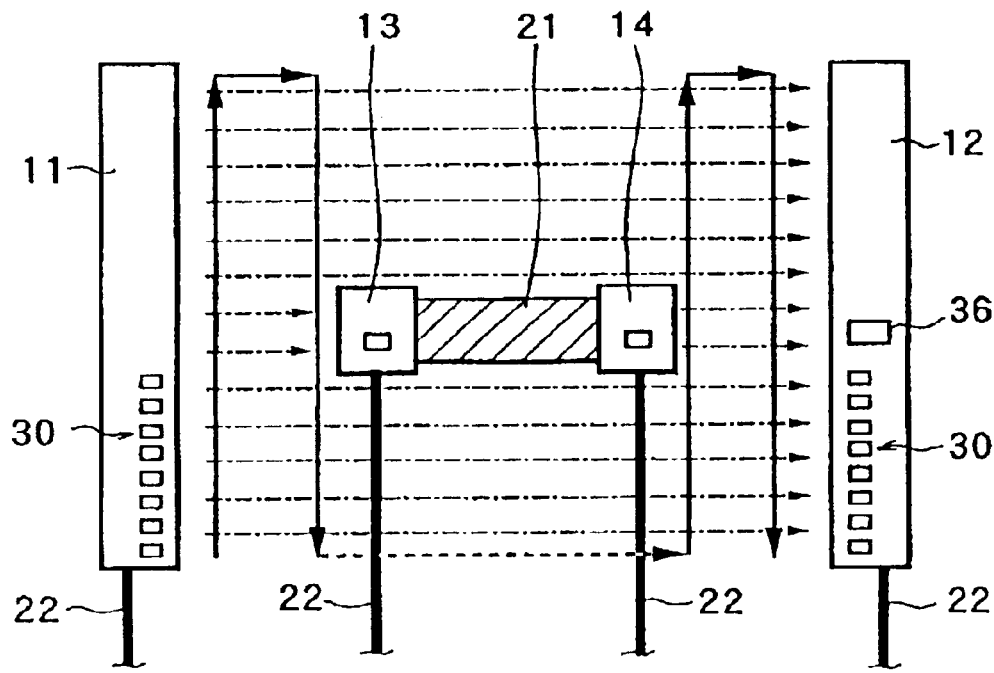

METHOD OF INSTALLING A MULTI-BEAM PHOTOELECTRIC SAFEGUARD SYSTEM AND METHOD OF ADJUSTING ITS OPTICAL AXES

FIELD OF THE INVENTION

This invention relates to a multi-beam photoelectric safeguard system and, more particularly, to a method of installing a safeguard system including main light emitting and detecting devices and sub light emitting and detecting devices and a method of adjusting their optical axes.

BACKGROUND OF THE INVENTION

Multi-beam photoelectric safeguard systems, comprising a light emitting device including a plurality of aligned light emitting elements and a light detecting device including a plurality of corresponding photodetectors as one unit, are commonly employed to detect the intrusion of an optical obstacle in a wide detection area. Multi-beam photoelectric safeguard systems are typically used to make protective fences, i.e. light curtains, along boundaries of prohibited areas where machine tools, punching machines, pressing machines, casting machines, automatic controllers and the like are installed, so that, if a part of the body of an operator, for example, intrudes into such a prohibited area, the system detects the intrusion and immediately stops the machine and/or gives a warning signal.

Regarding relative placement between the light emitting device and the light detecting device of a multi-beam photoelectric safeguard system, in case a machinery 1 such as a press as shown in FIG. 1 includes a projecting portion 2 projecting toward the operator, one of solutions is to place the safeguard system 3 in a position beyond the proximal end of the projecting portion 2 where the safeguard system does not interfere the projection 2 at all.

This placement, however, increases the horizontal distance X1 from the work center O of the machinery 1 to the safeguard system 3 (light curtain), hence increases the total area for installment of the press, for example, including the area for its safeguard system, and therefore decreases the working efficiency of the press.

In case the machinery 1 includes the projecting portion 2 that projects toward the operator, another solution is to place the safeguard system 3 as shown in FIGS. 2 and 3. In the conventional example shown here, the safeguard system 3 (light curtain) is positioned close to the machinery 1, and rearranged beforehand to exclude from effective detection the zone 4 encountering the projecting portion 2, i.e. the zone 4 where some of optical axes 5 forming the light curtain are optically blocked by the projecting portion 2. That is, a blanking function, which excludes the zone 4 encountering the projection 2 as a non-detection area beforehand, permits the safeguard system 3 (light curtain) to be placed even at a position where it interferes the projecting portion 2.

In this configuration, since the protective fence, i.e. light curtain, can be positioned closely to the machinery 1 (X2<X1) so as to keep a safety distance as small as possible with respect to the machinery 1, the working efficiency can be improved.

However, this approach relying on invalidating some of the optical axes 5 in the zone 4 excludes the full extension of the zone 4 from detection, including a section or sections at one or both sides of the projecting portion, although there is equally the possibility that an optical obstacle intrudes into the prohibited are through that section. To compensate this defect, another safeguard measure has to be employed, such as, for example, covering each such section of the zone 4 with a physical fence 6 such as a metal plate or net as shown in FIG. 4.

Japanese Patent Laid-Open Publication No. S63-43099 proposes a multi-beam photoelectric safeguard system contemplating the existence of a projecting portion as discussed above. The safeguard system disclosed in this publication is comprised of a pair of light emitting and detecting devices including a plurality of light emitting elements and complementary photodetectors, respectively, and a pair of reflection mirrors disposed adjacent to the projecting portion so that, in the zone encountering the projecting portion, a light curtain is made at one or opposite sides of the projecting portion by reflecting light beams from the light emitting and detecting devices at the reflection mirrors and receiving the reflected light beams at the same light emitting and detecting devices.

With the safeguard system taught by that publication, however, it is difficult to adjust the optical axes between the light emitting and detecting devices and the optical alignment of respective light emitting elements and photodetectors with associated reflection mirrors. Especially when the optical axes are arrayed closely, the difficulty becomes greater. Furthermore, since each of the light emitting and detecting devices has to include light emitting elements or photodetectors for emitting or detecting light beams to and from the reflection mirrors, the light emitting and detecting devices inevitably become bulky.

SUMMARY OF THE INVENTION

It is therefore an object of the invention to provide a method of installation and a method of adjusting optical axes of a multi-beam photoelectric safeguard system capable of positioning a light curtain made of closely arrayed optical axes very closely to a machinery or equipment such as a press, which requires the safeguard system.

A further object of the invention is to provide a method of installation and a method of adjusting optical axes of a multi-beam photoelectric safeguard system which is suitable for use with a machinery or equipment such as a press, which requires the safeguard system and includes a portion projecting toward the operator, and can make a light curtain closely to the press with no invalidated zone.

A still further object of the invention is to provide a method of installation of a multi-beam photoelectric safeguard system for making a light curtain without non-detection zones around an interfering object by using a main light emitting device and a sub light detecting device operable according to a basic operation sequence to sequentially emit light beams from the main light emitting device at predetermined timings, which can simultaneously generate a new operation sequence incorporating sub light emitting and detecting devices as well.

Those objects of the invention can be accomplished by various aspects of the invention.

According to an aspect of the invention, there is provided a method of installing a multi-beam photoelectric safeguard system for making a light curtain with a number of light beams around an interfering object, the multi-beam photoelectric safeguard system including:
  a main light emitting device having a plurality of light emitting elements aligned in an array at equal intervals;
  a main light detecting device disposed in an opposed relationship with the main light emitting device and having a plurality of photodetectors equal in number to the light emitting elements and arranged in an array at regular intervals;

a sub light detecting device disposed adjacent to one side of the interfering object interrupting a light beam of at least one optical axis of the light curtain, and including at least one photodetector capable of detecting a light beam from the main light emitting device;

a sub light emitting device disposed adjacent to the other side of the interfering object and capable of emitting a light beam toward the main light detecting device; and the light curtain including a main detection area defined between the main light emitting device and the main light detecting device, a first sub detection area defined between the main light emitting device and the sub light detecting device, and a second sub detection area defined between the sub light emitting device and the main light detecting device, the method comprising:

(a) positioning the main light emitting device and the main light detecting device relative to each other and identifying a blanking optical axis interrupted by the interfering object among the light beams between the main light emitting device and the main light detecting device;

(b) placing the sub light detecting device adjacent to one side of the interfering object and thereafter positioning same relative to the main light emitting device by moving the sub light detecting device; and (c) placing the sub light emitting device adjacent to the other side of the interfering object and thereafter positioning same relative to the main light detecting device by moving the sub light emitting device.

In a preferred embodiment of the invention, relative positioning of the main light emitting and detecting devices and adjustment of their optical axes may be carried out either without any interfering object or under the existence of such object.

In an embodiment of the invention, an optical axis adjustment display or optical axis adjustment display lamp is typically provided on the main light emitting device and/or main light detecting device. The operator can confirm completion of relative positioning of the main light emitting and detecting devices and adjustment of their optical axes by watching the optical axis adjustment display. Similarly for sub light detecting and emitting devices, an optical axis adjustment display or display lamp is preferably provided on the sub light detecting device and or sub light emitting device.

In another preferred embodiment, a controller for substantially controlling light emitting and detecting devices of the safeguard system may be provided, and an optical axis adjustment display or display lamp may be provided on the controller such that adjustment of optical axes of all light emitting and detecting devices contained in the safeguard system can be confirmed totally on the optical axis adjustment display of the controller.

In another preferred embodiment, the main light emitting and detecting devices forms a basic unit of the safeguard system, and sub light emitting and detecting devices may be added as an optional unit if a user requests. The main light emitting and detecting devices as the basic unit operate according to a preset basic operation sequence. In the basic sequence, light emitting elements contained in the main light emitting device are sequentially activated at predetermined timings for a predetermined length of time, individually.

When the sub light detecting and emitting devices are added to the main light emitting and detecting device activated by the basic operation sequence, by identifying the blanking optical axis, it is possible to automatically generate a modified operation sequence for additionally determining operations of the sub light emitting device on the basis of the blanking optical axis.

When optical axes are again adjusted upon maintenance after installation of the multi-beam photoelectric safeguard system suitable for use of the present invention, it is advantageous to first adjust optical axes between the main light emitting and detecting devices by moving them relative to each other, next adjust the optical axes between the main light emitting device and the sub light detecting device by moving the latter, and finally adjust optical axes between the sub light emitting device and the main light detecting device by moving the former.

As another method of optical axis adjustment, it is possible to first adjust optical axes between the main light emitting and detecting devices by moving them relative to each other, next adjust optical axes between the sub light emitting device and the main light detecting device by moving the former, and finally adjust the optical axes between the main light emitting device and the sub light detecting device by moving the latter.

These and other objects and advantages of the invention will appear from the following description of preferred embodiments mainly in conjunction with the accompanying drawings.

BRIEF DESCRIPTION OF THE DRAWINGS

FIG. 4 is a diagram illustrating a conventional system covering a non-detection area with a metal net or the like;

FIG. 21 is a flowchart of procedures in a teaching mode for automatically generating the modified operation sequence;

FIG. 22 is a diagram for explaining the first step of procedures according to the invention for optical axis adjustment of the light emitting and detecting devices of the multi-beam photoelectric safeguard system;

FIG. 25 is a diagram for explaining the fifth step of procedures according to the invention for optical axis adjustment of the light emitting and detecting devices of the multi-beam photoelectric safeguard system;

FIG. 26 is a diagram for explaining the sixth step of procedures according to the invention for optical axis adjustment of the light emitting and detecting devices of the multi-beam photoelectric safeguard system;

DETAILED DESCRIPTION OF THE INVENTION

Preferred embodiments of the invention will now be explained below with reference to the drawings.

Figure 1:
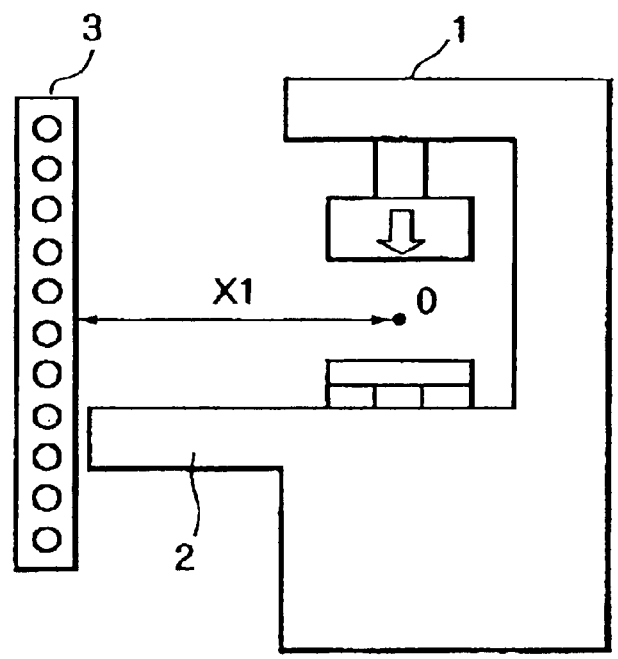
FIG. 1 is a diagram illustrating a conventional multi-beam photoelectric safeguard system from its side angle to explain a way of installation thereof.
Figure 2:
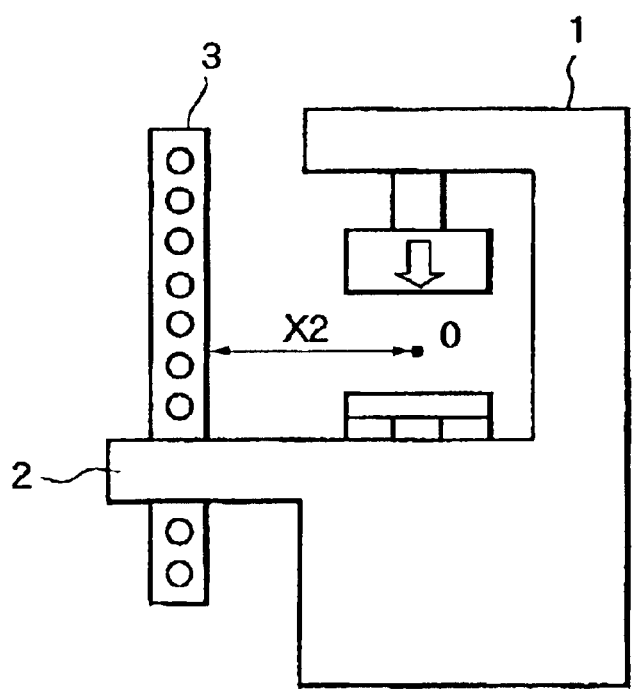
FIG. 2 is a diagram of a conventional multi-beam photoelectric safeguard system from its side angle to explain another way of installation.
Figure 3:
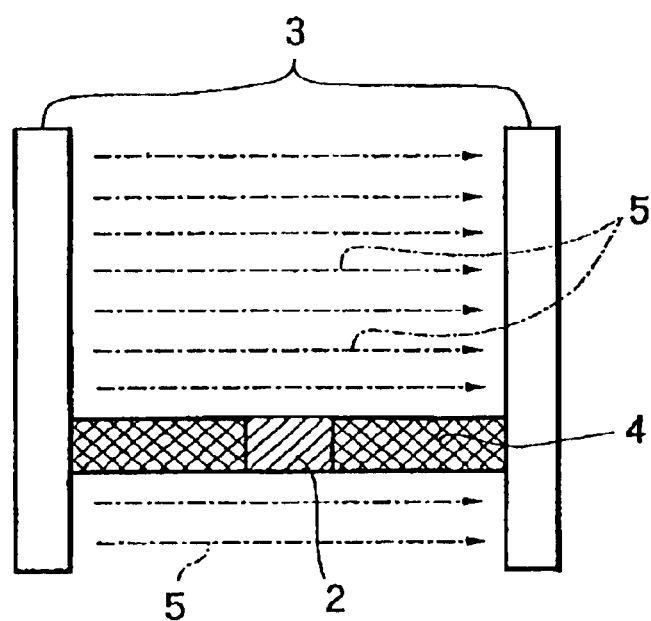
FIG. 3 is a diagram illustrating the conventional multi-beam photoelectric safeguard system of FIG. 2 from its front angle to explain the same way of installation.
Figure 4:
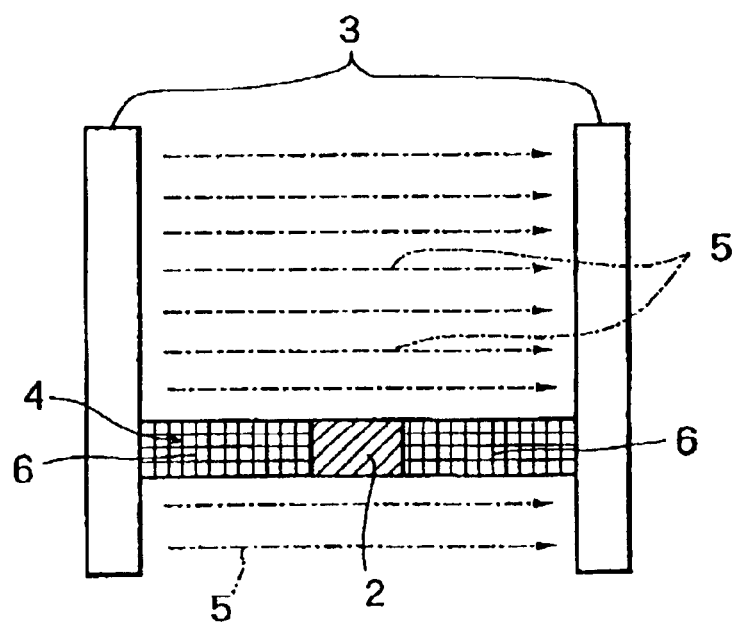
Figure 5:
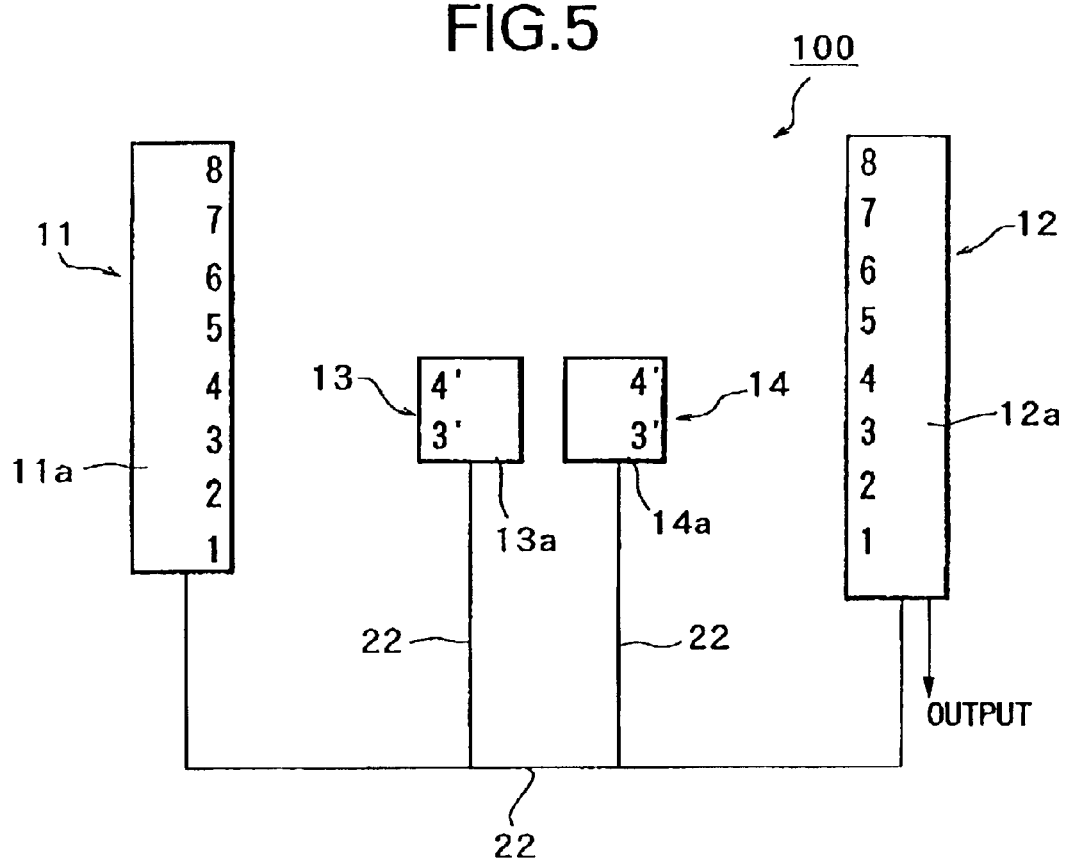
FIG. 5 is a diagram schematically showing the entire configuration of a multi-beam photoelectric safeguard system taken as an example for use of the present invention.
Figure 6:
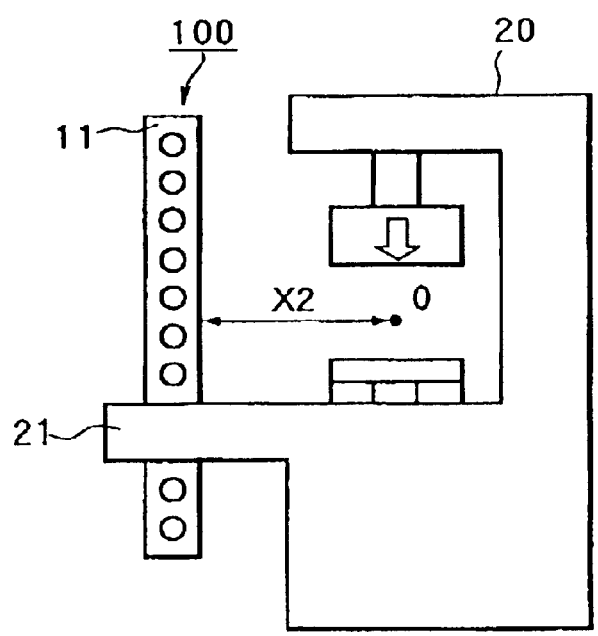
FIG. 6 is a diagram illustrating the safeguard system according to the embodiment of FIG. 5 from its side angle to show a way of installation thereof.

Referring to FIG. 5, the multi-beam photoelectric safeguard system 100 includes a main light emitting device 11 and a complementary main light detecting device 12 as the basic units thereof. Both the main light emitting device 11 and the main light detecting device 12 constituting the basic units can be extended by connecting one or more additional such devices in series or in parallel, respectively. The safeguard system 100 further includes a sub light detecting device 13 complementary with an opposed section of the main light emitting device 11, and a sub light emitting device 14 complementary with an opposed section of the main light detecting device 12.

The main light emitting device 11 has an elongate case 11a. N (eight in this embodiment) light emitting elements (not shown), which may be light emitting diodes (LEDs), are arranged in the case 11a at regular intervals in an array along the lengthwise (longitudinal) direction thereof. The interval of the light emitting elements may be 20 mm, for example, although it may be determined otherwise, either longer or shorter.

The main light detecting device 12 also has an elongate case 12a, and photodetectors (not shown) equal in number to the light emitting elements (eight in this embodiment) are arranged in the case 12a at regular intervals. The interval of the adjacent photodetectors is equal to that of the light emitting elements. If the interval of the light emitting elements is 20 mm, then the interval of the photodetectors is also 20 mm.

The sub light detecting device 13 has a relatively short case 13a, and one or more light photodetectors (not shown) less than the light emitting elements or photodetectors of the main light emitting device 11 or main light detecting device 12 are arranged in the case 13a in an array. In this embodiment, two photodetectors are provided, and their interval is equal to that of the light emitting elements of the main light emitting device 11. Thus, if the interval of the light emitting elements of the main light emitting device is 20 mm, the interval of the photodetectors of the sub light detecting device 13 is also 20 mm.

The sub light emitting device 14 includes a relatively short case 14a, and one or more light emitting elements (not shown) equal in number to the photodetector or photodetectors of the sub light detecting device 13 are arranged in the case 14a in an array. Here again, LEDs are typically used as the light emitting elements. Two photodetectors are provided in this embodiment, and their interval is equal to that of the photodetectors of the main light detecting device 12. Thus, if the interval of the photodetectors of the main light detecting device 12 is 20 mm, the interval of the light emitting elements of the sub light emitting device 14 is also 20 mm.

Figure 7:
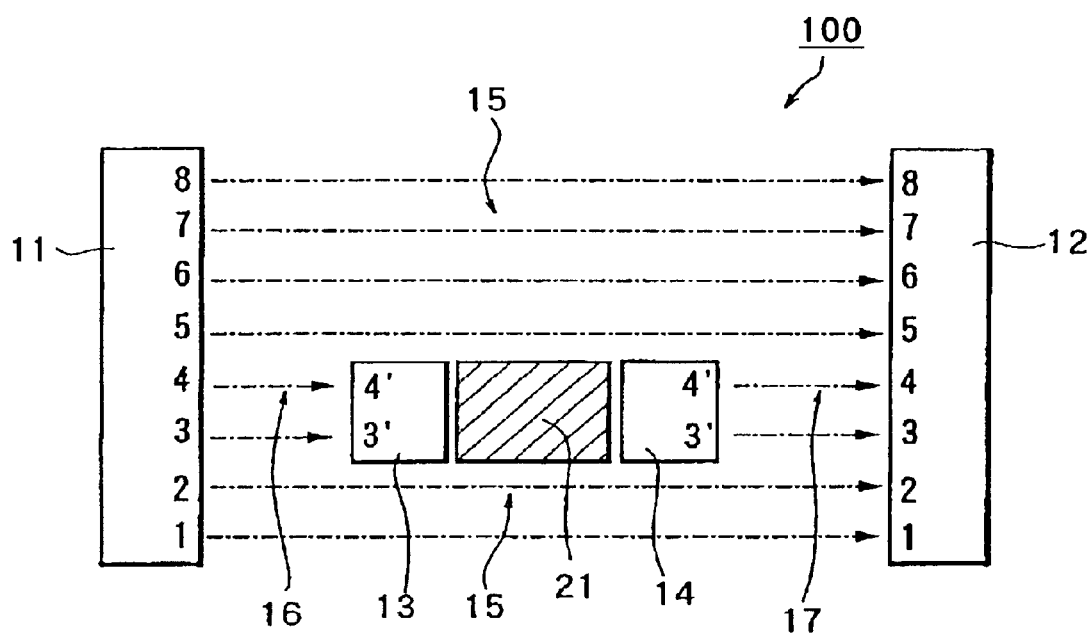
FIG. 7 is a diagram for explaining a main detection area defined between a main light emitting device and a main light detecting device, a first sub detection area defined between the main light emitting device and a sub light detecting device, and a second sub area defined between a sub light emitting device and the main light detecting device in the safeguard system shown in FIG. 5.

The numbers from 1 to 8 shown in FIG. 5 represent the numbers of optical axes between the main light emitting device 11 and the main light detecting device 12. As seen from FIG. 5, the main light emitting device 11 and the main light detecting device 12 are placed in an opposed relation on a common plane to emit and receive light beams that form a light curtain (FIG. 7). The area where the light beams run between the light emitting and detecting devices 11, 12 is herein named the main detection area 15. The sub light detecting device 13 and the sub light emitting device 14 are placed to interrupt one or more optical axes between the main light emitting and detecting devices 11, 12 to define the first sub detection area 16 between an opposed section of the main light emitting device 11 and the sub light detecting device 13, and the second sub detection area 17 between the sub light emitting device 14 and an opposed section of the main light detecting device 12 (FIG. 7).

More specifically, the sub light detecting device 13 is placed close to one side surface of the a projecting portion 21 that projects toward an operator of a machinery 20, and opposed to the main light emitting device 11 to define the first sub detection area 16 together with opposed light emitting elements of the main light emitting device 11. The sub light emitting device 14 is placed close to the opposite side surface of the projecting portion 21, and opposed to the main light detecting device 12 to define the second sub detection area 17 together with opposed photodetectors of the main light detecting device 12.

As a result, light beams traveling in the main detection area 15 and the sub detection areas 16, 17 form a light curtain all around the non-detection area defined between the sub light detecting and emitting devices 13, 14 and occupied by the projecting portion 21 of the press 20.

FIGS. 5 and 7 illustrate the sub light detecting device 13 and the sub light emitting device 14 as lying to partly take over one or more of optical axes between the main light emitting and detecting devices 11, 12 at opposite sides of the non-detection area defined between the sub light detecting and emitting devices 13, 14. In the drawings, the sub light detecting and emitting devices 13, 14 are positioned to partly take over the third and fourth optical axes; however, their position relative to the optical axes is determined, depending on the position of the projecting portion 21. The number of the pairs of photodetectors and light emitting elements in the sub light detecting and emitting devices 13, 14 is determined in accordance with the size of the projecting portion 21 or other obstacle to equally compensate for the number of optical axes between the main light emitting and detecting devices 11, 12, which will be optically blocked by the projecting portion 21.

The main light emitting device 11, main light detecting device 12, sub light detecting device 13 and sub light emitting device 14 are connected altogether via a communication line or signal line 22.

Figure 8:
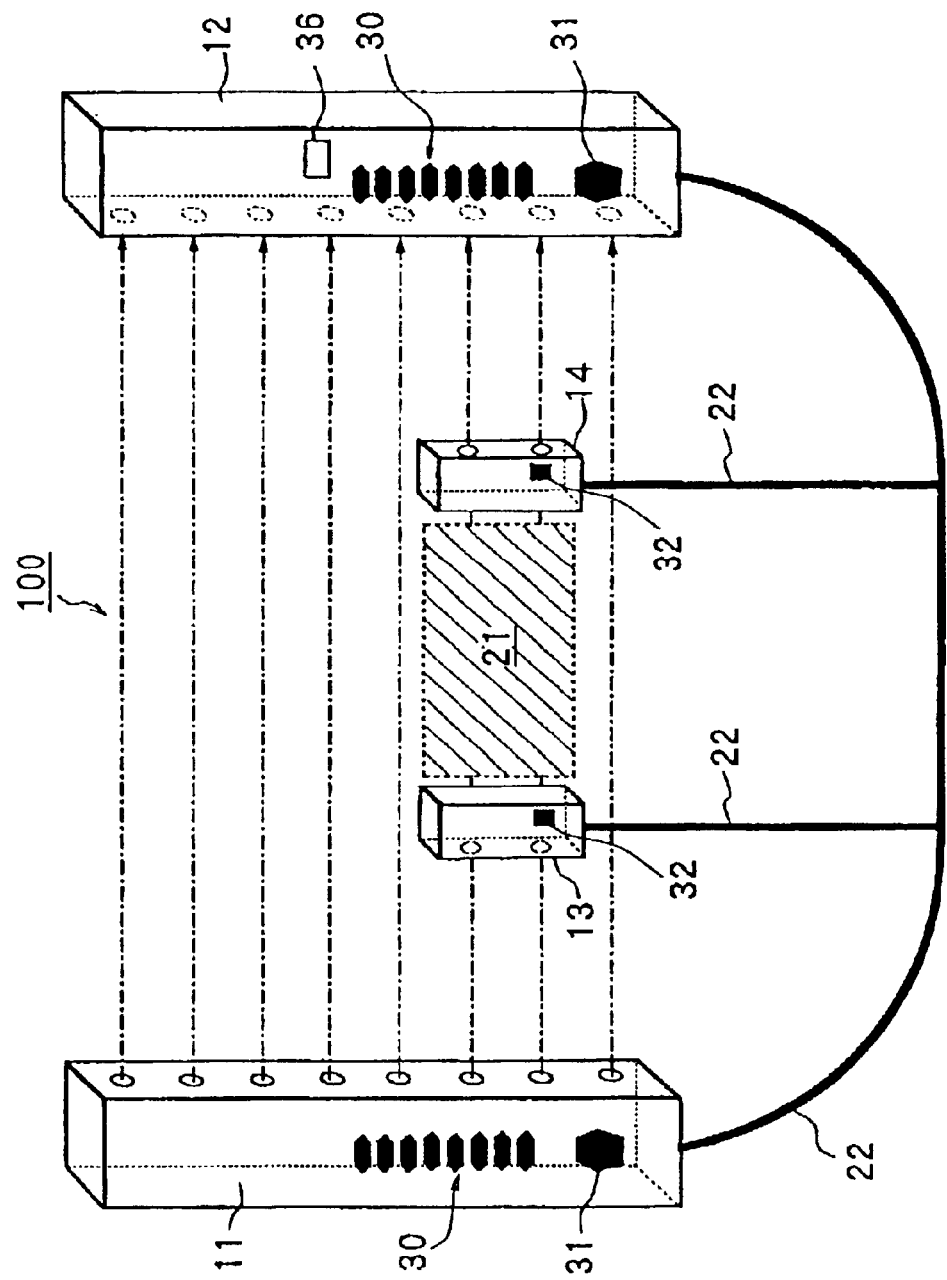
FIG. 8 is a diagram schematically showing the entire configuration of the multi-beam photoelectric safeguard system shown in FIG. 5.

Referring to FIG. 8, the main light emitting and detecting devices 11, 12 each include an optical axis adjustment display 30 composed of a plurality of light emitting diode (LED) segments vertically aligned side by side. Here are used dichromatic light emitting diodes that can emit, for example, red and green light. Each of the main light emitting device 11 and the main light detecting device 12 also has an output display such as ON/OFF light using LED that normally emits green light, for example, and otherwise emits red light, for example, when any unexpected optical axes are blocked or detected, or when the system itself fails, for example.

The optical axis adjustment display, or optical axis adjustment display lamp, 30 composed of a plurality of light emitting diode segments may be used in any appropriate mode of display. Typically, when all beams of all optical axes enter into the main light detecting device 12, all LED segments may emit green light. Then, if part of the optical axes are blocked, a number of segments proportional to the blocked optical axes, i.e. proportional to the light beams failing to reach the main light emitting device 12, may emit red light sequentially from the bottom one, and a number of segments corresponding to the number of the blocked optical axes turn off from the top one. That is, the optical axis adjustment display 30 displays a bar type representation in which a red bar extends upward as the ratio of incident beams becomes higher, or in response to the degree of optical axis adjustment, in other words, the ratio between interrupted beams and detected beams, typically for facilitating an operator to confirm accurate alignment between the light emitting elements and photodetectors of the light emitting and detecting devices 11, 12 upon installing the safeguard system 100 on site.

The sub light emitting device 13 and the sub light detecting device 14 each include a optical axis adjustment display 32 having substantially the same function as the optical axis adjustment display or display lamp 30 already explained.

The optical axis adjustment displays 30 of the main light emitting and detecting devices 11, 12 and/or the optical axis adjustment displays 30 of the sub light detecting and emitting devices 32 may be any of the below-listed conventional types.

(1) A display lamp turned on or off when optical axis adjustment is confirmed by detection of light beams of all optical axes;

(2) A display lamp changed in color from red to green, for example, when optical axis adjustment is confirmed by detection of light beams of all optical axes;

(3) A display lamp having a plurality of LEDs that are selectively, cumulatively turned on or off in response to the intensity of light detected by the light detecting device;

(4) A display lamp changed in flickering speed in response to the ratio between the interrupted optical axes and the other optical axes of detected light beams;

(5) A display lamp changed in flickering speed in response to the intensity of light detected by the light detecting device;

(6) A set of display lamps individually associated with respective optical axes to individually represent interruption or detection of their own associated optical axes;

(7) A set of display lamps, each associated with several divisional blocks of optical axes made by dividing a number of optical axes between the light emitting and detecting devices, to represent the interruption or detection status of its own associated block.

Figure 9:
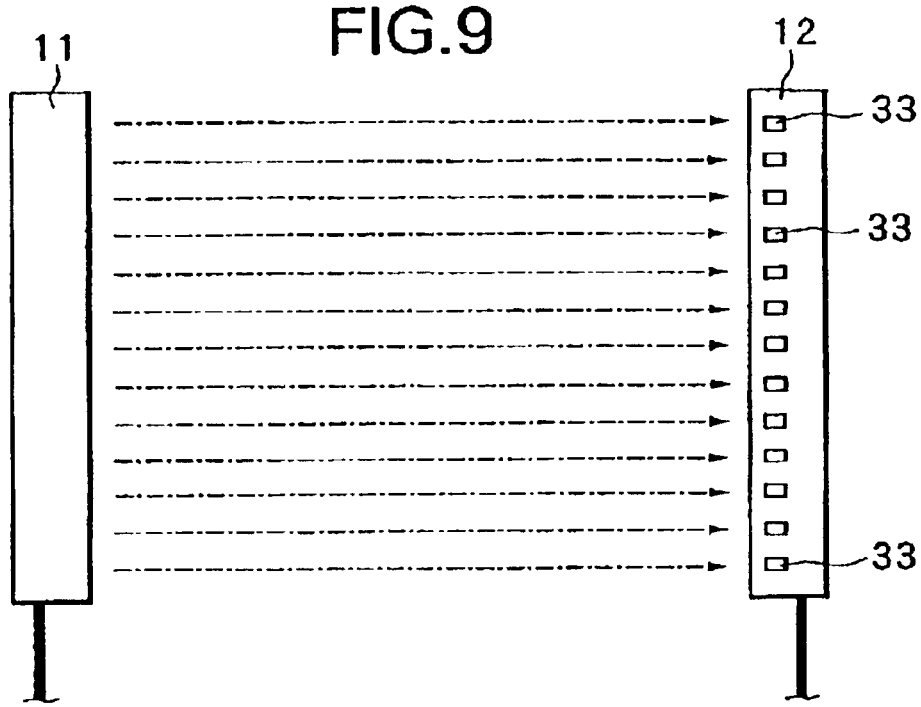
FIG. 9 is a diagram for explaining an example of optical axis adjustment display lamp or optical axis adjustment display provided in a multi-beam photoelectric safeguard system related to the present invention.

FIG. 9 shows an example of the optical axis adjustment display 30, which is a set of display lamps 33, associated with individual optical axes, respectively, as listed in (6) above. FIG. 9 illustrates a configuration having display lamps for individual optical axes only on the part of the main light detecting device 12. However, the display lamps 33 may be provided only on the part of the main light emitting device 11 or in both devices 11 12. Similarly, display lamps 33 for individual optical axes may be provided as the optical axis adjustment display 32 in the sub light detecting device 13 and/or the subs light emitting device 14.

Figure 10:
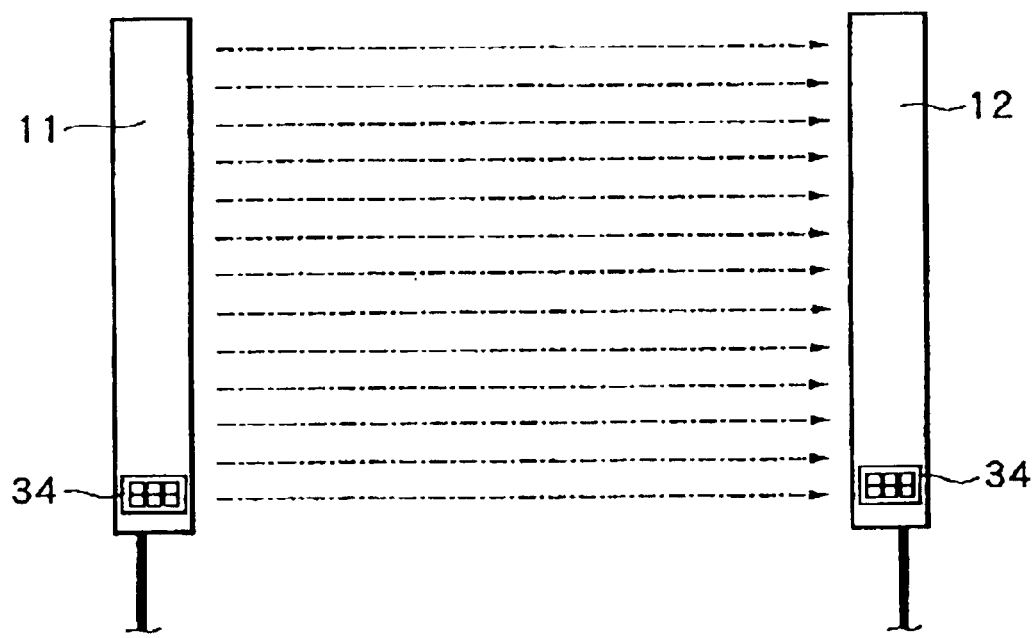
FIG. 10 is a diagram for explaining another example of optical axis adjustment display lamp or optical axis adjustment display provided in a multi-beam photoelectric safeguard system related to the present invention.

As one type of one or more above-listed examples, FIG. 10 shows optical axis adjustment displays 30 in form of a liquid crystal display or seven segment LEDs 34 configured to make a numerical representation of the number of optical axes of detected light beams, number of interrupted optical axes or ratio between interrupted optical axes and the other optical axes of detected light beams. FIG. 10 illustrates such numerical displays 34 in both the light emitting and detecting devices 11, 12, but only one of the devices 11 12 may have such a numerical display 34. Similarly, one or both of the sub light detecting and emitting devices 13, 14 may have such a numerical display 34.

In FIG. 8, reference numeral 36 denotes a teaching switch whose functions will be explained later. Although the teaching switch 36 is provided on the main light detecting device 12 in the example of FIG. 8, it may alternatively be positioned on the main light emitting device 11.

Figure 11:
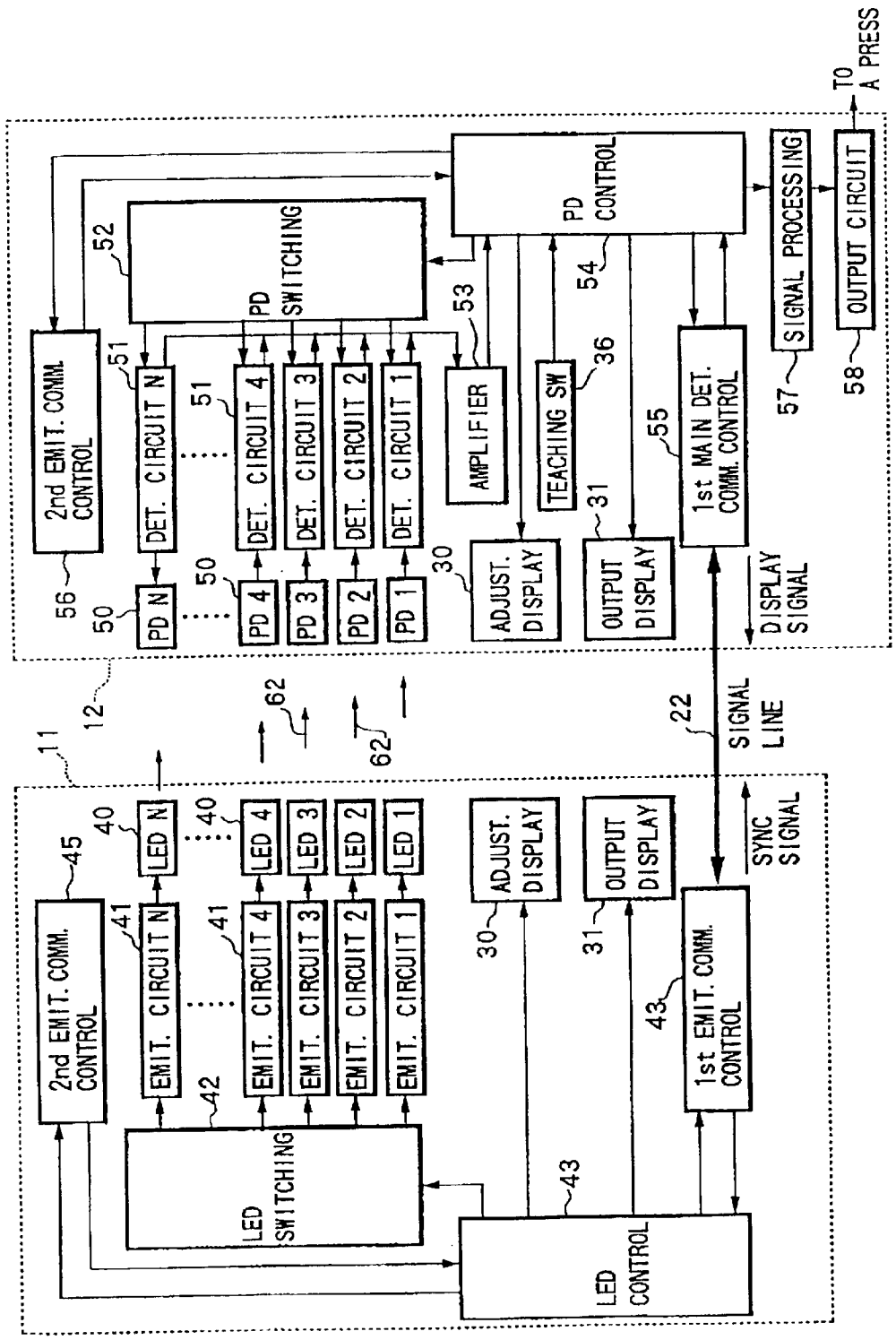
FIG. 11 is a block diagram of the main light emitting device and the main light detecting device constituting the basic units of the multi-beam photoelectric safeguard system shown in FIG. 5.

Referring to FIG. 11, the main light emitting device 11 includes N (eight, for example) emitter circuits 41 for driving N LEDs 40 used as light emitting elements, an LED switching circuit (optical axis switching circuit) 42 for scanning these light emitting circuits 41 in a time-sharing manner, and an LED control circuit 43 for totally controlling the main light emitting device 11. The LED control circuit 43 outputs a control signal to the optical axis adjustment display 30 and the output display 31.

The main light emitting device 11 further includes a first emitter communication control circuit 44 for controlling bi-directional signal exchange of the main light emitting device 11 with the main light detecting device 12, sub light detecting device 13, etc., and a second emitter communication control circuit 45 for controlling communication between the main light emitting device 11 and a further main light emitting device (not shown) that may be additionally connected in series thereto for making a larger light curtain.

On the other hand, the main light detecting device 12 has N (eight, for example) detector circuits 51 for driving N photodetectors 50, a photodetector switching circuit 52 for scanning these light detecting circuits in a time-sharing manner, an amplifier circuit 53, and a photodetector control circuit 54 for totally controlling the main light detecting device 12. The photodetector control circuit 54 outputs a control signal to the optical axis adjustment display 30 and the output display 31.

The main light detecting device 12 further includes a first detector communication control circuit 55 for controlling bi-directional signal exchange of the main light detecting device 12 with the main light emitting device 11, sub light detecting device 13, etc., and a second detector communication control circuit 56 for controlling communication between the main light detecting device 12 and a further main light detecting device (not shown) that may be additionally connected in series thereto to make a larger light screen.

Furthermore, the main light detecting device 12 includes a signal processing circuit 57. The circuit 57 is typically configured to be always fed by the photodetector control circuit 54 with signals indicating whether light beams of respective optical axes have been normally detected by respective photodetectors or not, and to process the signals accordingly. When the signal processing circuit detects from those signals that optical blockage has occurred two or three times within a predetermined period of time, it supplies an OFF signal through the output circuit 58 to an external device (not shown) such as a control panel of the press 20 or an alarm lamp associated with the light curtain made by the main light emitting device 11 and the main light detecting device 12 in order to stop the press 20 immediately.

Figure 12:
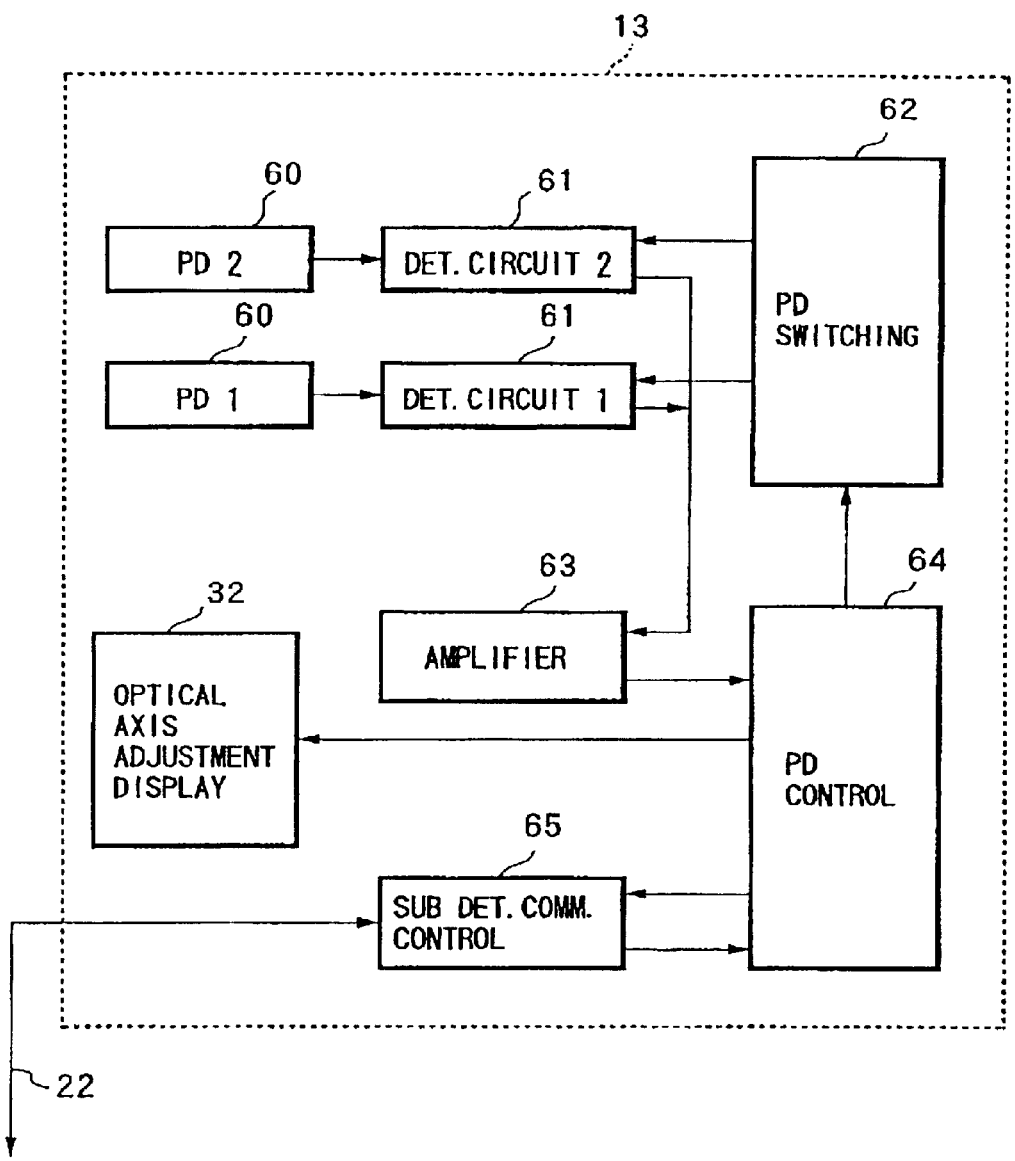
FIG. 12 is a block diagram of the sub light detecting device involved in the safeguard system shown in FIG. 5.

The sub light detecting device 13, best shown in FIG. 12, includes two detector circuits 61 for driving two photodetectors 60, in case of this embodiment, a photodetector switching circuit 62 for scanning these detector circuits in a time-sharing manner, an amplifier circuit 63, a photodetector control circuit 64 for totally controlling the sub light detecting device 13, and a sub detector communication control circuit 65 for controlling bi-directional signal exchange of the sub light detecting device 13 with the main light emitting device 11, sub light emitting device 14, etc., so that a control signal is output from photodetector control circuit 64 to the optical axis adjustment display 32.

Figure 13:
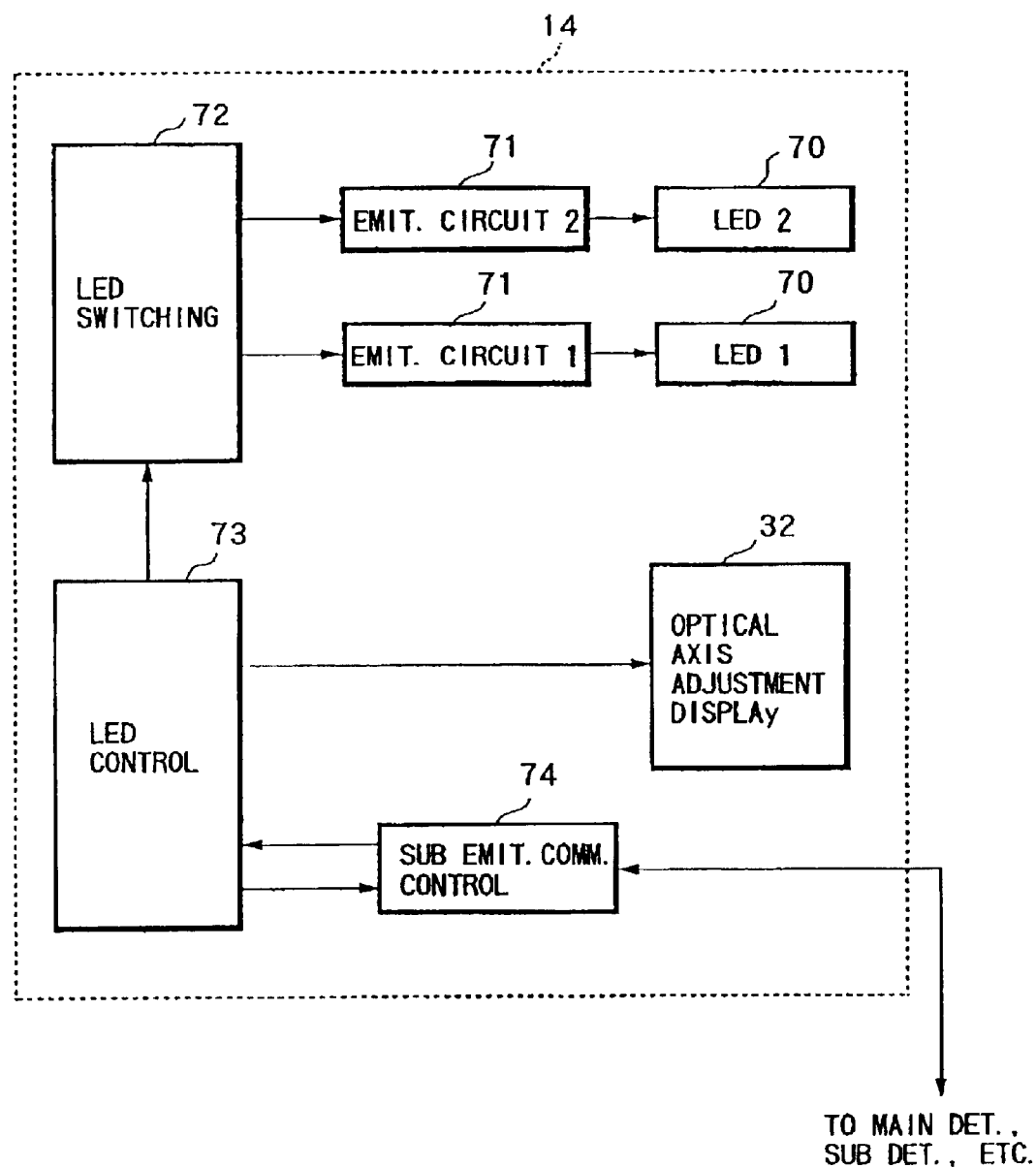
FIG. 13 is a block diagram of the sub light emitting device involved in the safeguard system shown in FIG. 5.

The sub light emitting device 14, best shown in FIG. 13, includes N emitter circuits 71 for driving two LEDs 70 used as light emitting elements, an LED switching circuit (optical axis switching circuit) 72 for scanning these emitter circuits 71 in a time-sharing manner, and an LED control circuit 73 for totally controlling the sub light emitting device 14. The sub light emitting device 14 includes also includes a sub emitter communication control circuit 74 for controlling bi-directional signal exchange of the sub light emitting device 14 with the main light emitting device 12, sub light detecting device 13, etc., so that a control signal is output from the LED control circuit to the optical axis adjustment display 32.

The safeguard system 100 is configured to selectively activate LEDs and photodetectors in associated light emitting and detecting devices at predetermined sequential timings, thereby to prevent the photodetectors from receiving light beams of optical axes other than their own optical axes, by exchanging information among the main light emitting device 11, main light receiving device 12, sub light receiving device 13 and sub light detecting device 14 via the signal line or communication line 22.

Figure 14:
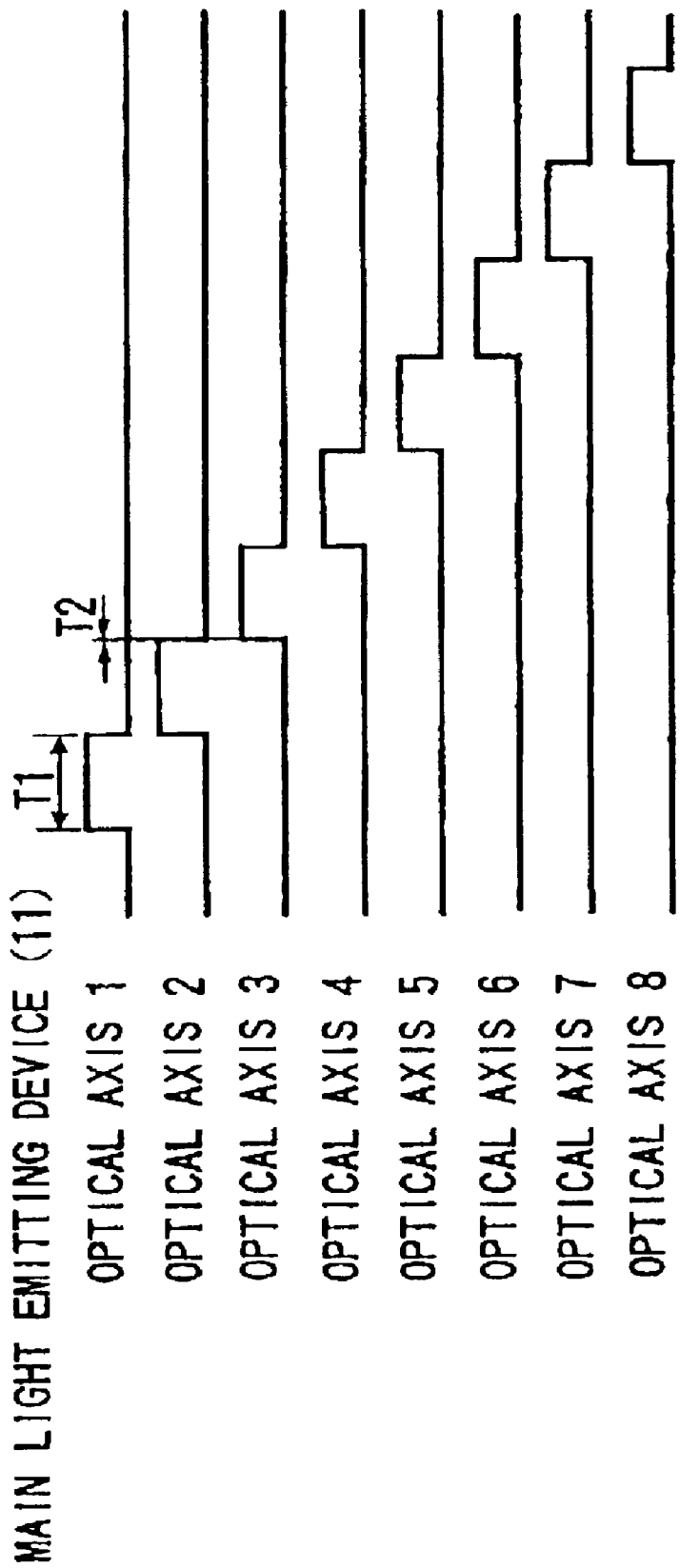
FIG. 14 is a diagram for explaining a basic operation sequence of the main light emitting and detecting devices as the basic unit of the main light detecting device shown in FIG. 5.

The main light emitting device 11 and the main light detecting device 12 is desirably preset to follow a basic operation sequence shown in FIG. 14. For example, in case the light curtain is formed without using the sub light detecting and emitting devices 13, 14, that is, in case a light curtain is made solely by the main light emitting and detecting devices 11, 12, the main light emitting and detecting devices 11, 12 operate according to the preset basic operation sequence of FIG. 14 (basic operation mode). Although FIG. 14 shows the basic operation sequence of the main light emitting device 11, individual photodetectors of the main light detecting device 12 are activated synchronously with activation of associated individual LEDs of the main light emitting device 11.

It will be appreciated from FIG. 14 that, in the basic operation sequence of the main light emitting and detecting devices 11, 12, the activated duration of time (T1) of each LED is constant for all LEDs and photodetectors, and the pause time from deactivation of each LED or photodetector to activation of the next LED or photodetector (T2) is also constant. That is, respective sets of associated LEDs and photodetectors are sequentially activated periodically for the same duration of time. The basic operation sequence shown in FIG. 14 can be automatically established, taking account of the periods of time T1, T2 and the number of all optical axes between the main light emitting and detecting devices 11, 12. An operation program or an electric circuit may realize this operation sequence.

Figure 15:
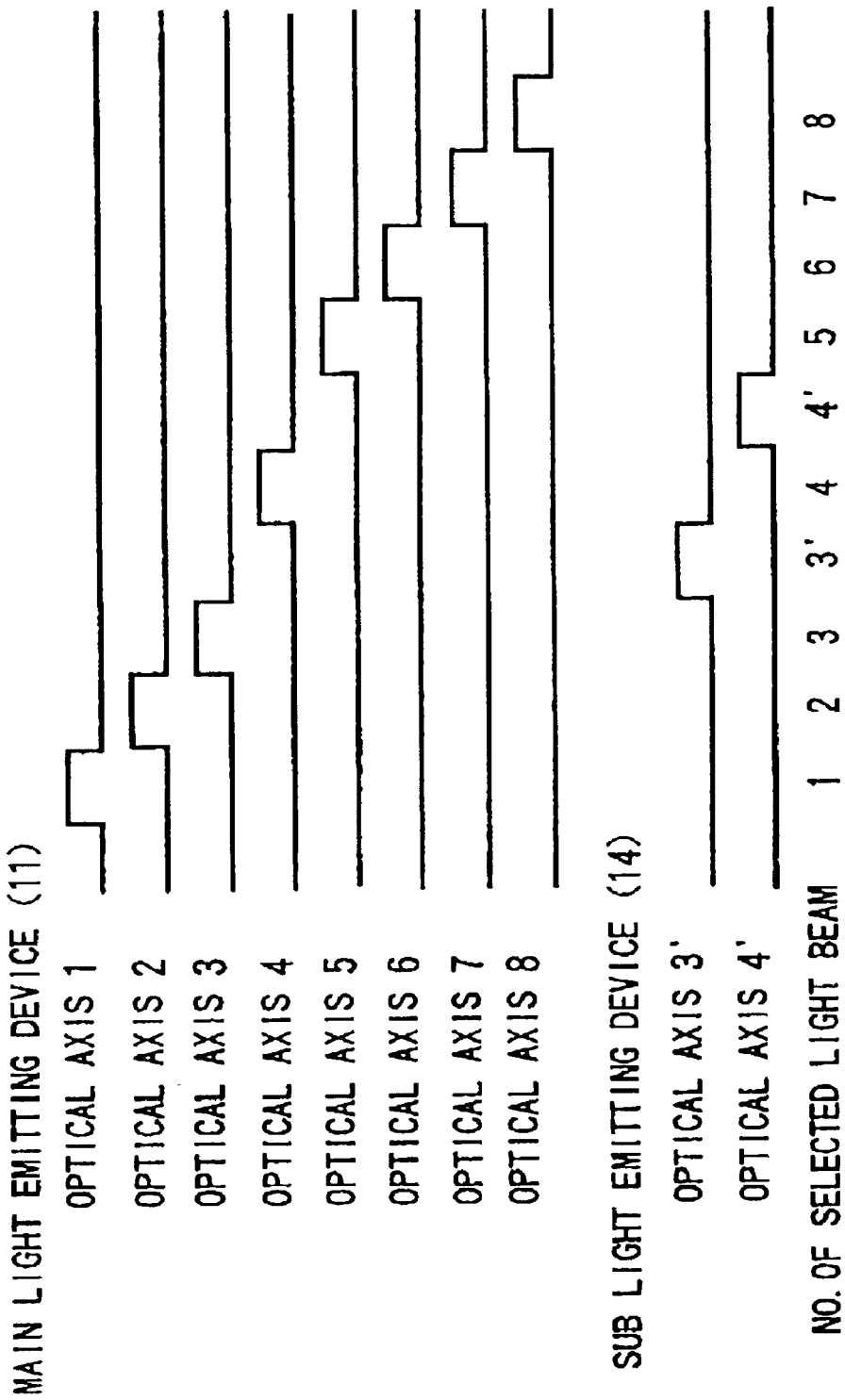
FIG. 15 is a diagram for explaining a multi-detection operation sequence or modified operation sequence of the safeguard system shown in FIG. 5.

In contrast, FIG. 15 shows an example of a multi-detection or modified operation sequence for use when operations of the sub light detecting device 13 and the sub light emitting device 14 are incorporated. As shown in FIG. 15, just after activating the LED for the third optical axis of the main light emitting device 11, the modified operation sequence activates the LED for the third optical axis of the sub light detecting device 14, while deferring activation of subsequent LEDs for subsequent optical axes. After that, the modified operation sequence activates the LED for the fourth optical axis of the main light emitting device 11 and, just after thereof, activates the associated LED of the sub light emitting device 14, while here again deferring activation of subsequent LEDs for subsequent optical axes.

Figure 16:
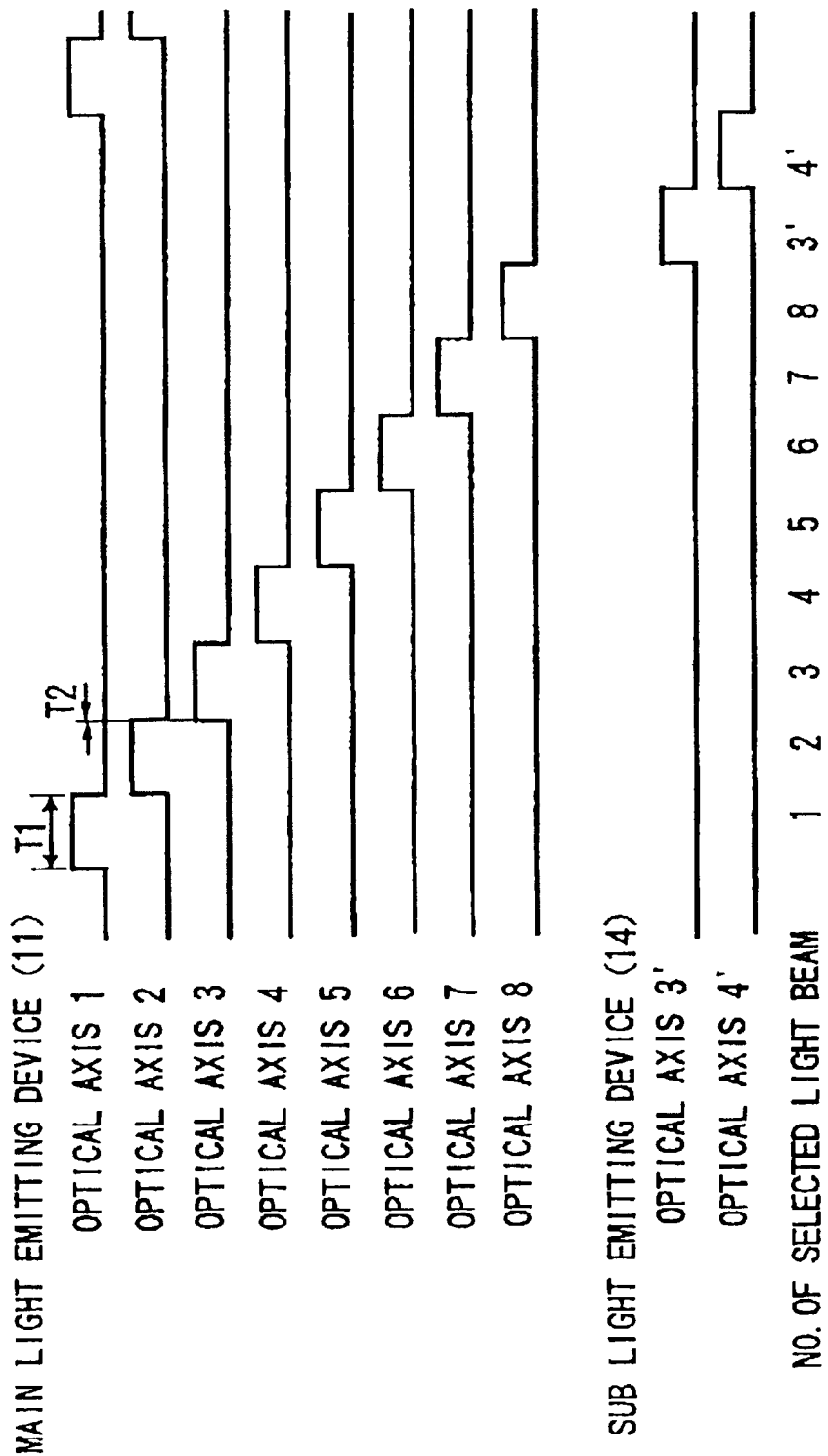
FIG. 16 is a diagram for explaining a multi-detection operation sequence or modified operation sequence as another example related to FIG. 5.

Instead of the sequence shown in FIG. 15, another sequence is also employable, in which the sub light emitting device 14 starts emission after the main light emitting device 11 completes emission from its all LEDs, and after the sub light emitting device 14 completes emission from its all LEDs, emission from the main light emitting device 11 is resumed (FIG. 16).

In the safeguard system 100, as apparent from the foregoing explanation, full extensions of six optical axes, namely, the first, second and fifth to eighth optical axes, between the main light emitting device 11 and the main light detecting device 12 form the main detection area 15, sectional extensions of the third and fourth optical axes between the main light emitting device 11 and the sub light detecting device 13 form the first sub detection area 16, and other sectional extensions of the third and fourth optical axes between the sub light emitting device 14 and the main light detecting device 12 form the second sub detection area 17. Then, light beams traveling in the main and sub detection areas, 15, 16, 17 make a light curtain extending all around the projecting portion 21.

Figure 17:
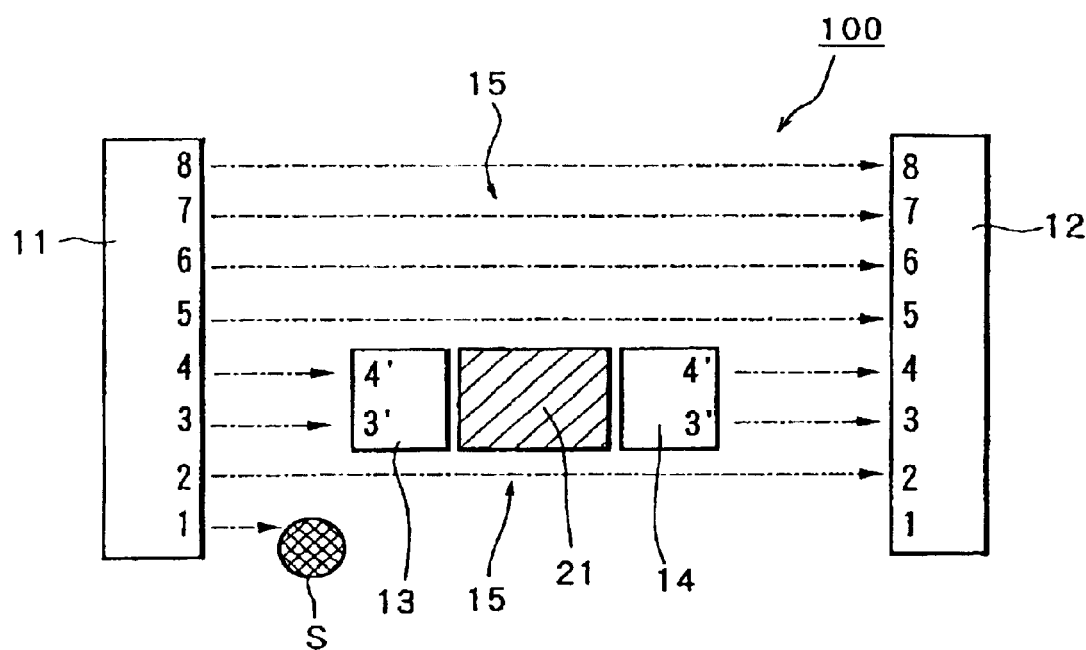
FIG. 17 is a diagram for explaining the situation of intrusion of an optical obstacle in the main detection area made by the safeguard system shown in FIG. 5.

For example, if an optical obstacle such as a part of the body of personnel blocks the first optical axis in the main detection area 15 formed between the main light emitting device 11 and the main light detecting device 12 as shown in FIG. 17, then the first photodetector of the main light detecting device 12 activated in sync with the first LED of the main light emitting device 11 cannot receive the optical beam. From this fact, it can be immediately acknowledged that optical blockage has occurred. Responsively, an OFF signal is supplied from the output circuit 58 through the signal processing circuit or detection circuit 57 contained in the main light detecting device 12 to an external circuit, and the press 20 is stopped immediately.

Figure 18:
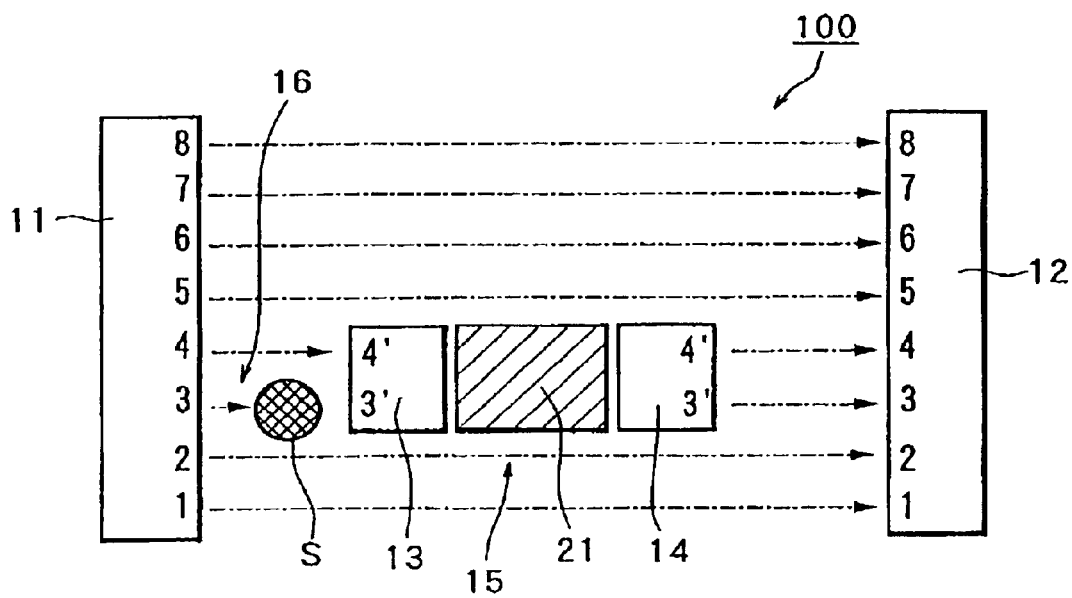
FIG. 18 is a diagram for explaining the situation of intrusion of an optical obstacle in the first sub detection area made by the safeguard system shown in FIG. 5.

In another example shown in FIG. 18, if the optical obstacle blocks the third optical axis in the first sub detection area 16 formed between the main light emitting device 11 and the sub light detecting device 13, the photodetector in the sub light detecting device 13 activated in sync with the third LED of the main light detecting device 11 cannot receive the optical beam. Responsively, the LED in the sub light emitting device 14 for the third optical axis does not emit light, and the associated photodetector in the main light detecting device 12 cannot receive any light beam at the predetermined timing. From this fact, it can be immediately acknowledged that optical blockage has occurred. Responsively, an OFF signal is supplied from the output circuit 58 via the signal processing circuit or detection circuit 57 contained in the main light detecting device 12 to the external device, and the press 20 is stopped immediately.

In the example of FIG. 18, the information that the sub light detecting device 13 did not receive any light beam from the main light emitting device 11 at a predetermined timing may be directly delivered from the sub light detecting device 13 to the main light detecting device 12 not through the step of non-emission from the sub light emitting device 14 and non detection by the main light detecting device 12 so that a blockage output is issued based on that information through the signal processing circuit or detection circuit 57 and the output circuit 58 contained in the main light detecting device 12 to the external device to stop the press 20 immediately.

Figure 19:
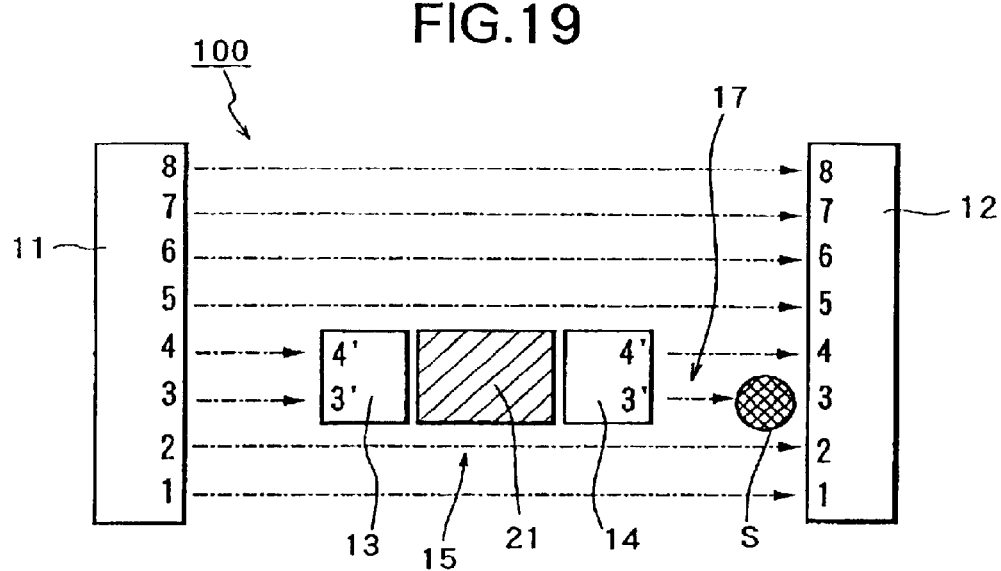
FIG. 19 is a diagram for explaining the situation of intrusion of an optical obstacle in the second sub detection area made by the safeguard system shown in FIG. 5.

In a further example shown in FIG. 19, if the optical obstacle S blocks the third optical axis in the second sub detection area 17 formed between the sub light emitting device 14 and the main light detecting device 12, the photodetector of the main light detecting device 12 cannot receive the optical beam from the LED in the sub light emitting device 14 associated with the third optical axis. From this fact, it is immediately acknowledged that optical blockage has occurred. Responsively, a blockage signal or OFF signal is output through the signal processing circuit or detection circuit 57 and the output circuit 58 contained in the main light detecting device 12 to the external device, and the press 20 is stopped immediately.

Since the main light emitting device 11, main light detecting device 12, sub light detecting device 13 and sub light emitting device 14 are connected altogether by the communication line or signal line 22, the safeguard system 100 can be readily modified to include the signal processing circuit or detection circuit 57 and the output circuit 58 in the main light emitting device 11 so as to output the blockage signal or OFF signal to the external device from the main light emitting device 11.

Figure 20:
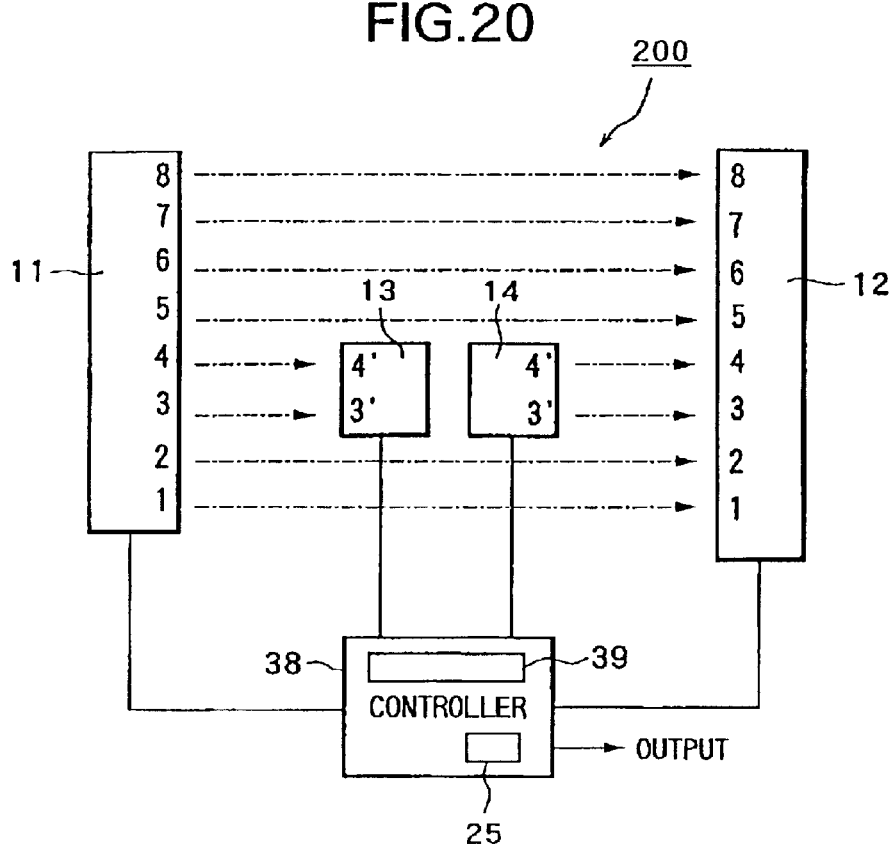
FIG. 20 is a diagram illustrating the entire configuration of the multi-beam photoelectric safeguard system shown in FIG. 5.

Although the safeguard system 100 heretofore explained is configured to operate according to the operation sequence incorporated in the main light emitting device 11, for example, the invention is also usable with another type of safeguard system 200 having a controller 38 as an additional separate controller as shown in FIG. 20. In the safeguard system 200 shown here, the controller 38 substantially controls the light emitting and detecting devices such as the main light emitting device 11. Thereby, any blockage signal from the main light detecting device 12 or sub light detecting device 13 is input to the controller 38, and an ON signal or OFF signal is output from the controller 38 toward an external device.

Also in the safeguard system 200, a modified operation sequence may be generated substantially in the photodetector control circuit 54 of the main light detecting device 12 through procedures explained later in detail. Alternatively, the controller 38 may realize this function of the photodetector control circuit 54 to generate the modified operation sequence.

In the safeguard system 20, the optical axis adjustment display 30 on one or both of the main light emitting/detecting devices 11, 12, and the optical axis adjustment display 32 on one or both of sub light emitting devices 13, 14 may be replaced by an optical axis adjustment display 39 provided on the controller 38, or alternatively, a teaching switch 36 may be provided (FIG. 20). The optical axis adjustment display 39 may have the same configuration as that of the optical axis adjustment display 30 or 31 already explained, or may be of any type of representation of optical axes among those listed herein before.

Alternatively, the controller 38 may include circuits similar to the signal processing circuit 57 and the output circuit 58 (FIG. 11), already explained, to output a blockage signal from the controller 38 to an external device (FIG. 20).

FIG. 21 et seq. are diagrams related to installation of the safeguard system 100 or 200. Explanation is made below with reference to these figures about procedures for installing the light emitting and detecting devices and automatic generation of a multi-detection sequence or modified sequence triggered by ON manipulation of the teaching switch 36.

First Step: Setting and Positioning of the Main Light Emitting and Detecting Devices 11 and 12 (FIG. 22)

The main light emitting device 11 and the main light detecting device 12 are first placed in predetermined positions relative to the press 20, for example, from which the projecting portion 21 has been removed.

After that, relative positions of the main light emitting and detecting devices 11, 12 are adjusted precisely (FIG. 22). That is, optical axes between the main light emitting and detecting devices 11, 12 are adjusted. This optical axis adjustment is carried out by fine adjustment of positions of the main light emitting and/or detecting devices 11, 12 so that all of their optical axes coincide. The operator can confirm whether the main light detecting device 12 has detected all optical beams sequentially emitted from LEDs of the main light emitting device 11 are certainly detected, that is, whether the main light emitting and detecting devices 11 12 have been precisely positioned relative to each other, by watching the optical axis adjustment displays or display lamps 30 on the main light emitting and detecting devices 11, 12, or the optical axis adjustment display on the controller 38.

Figure 23:
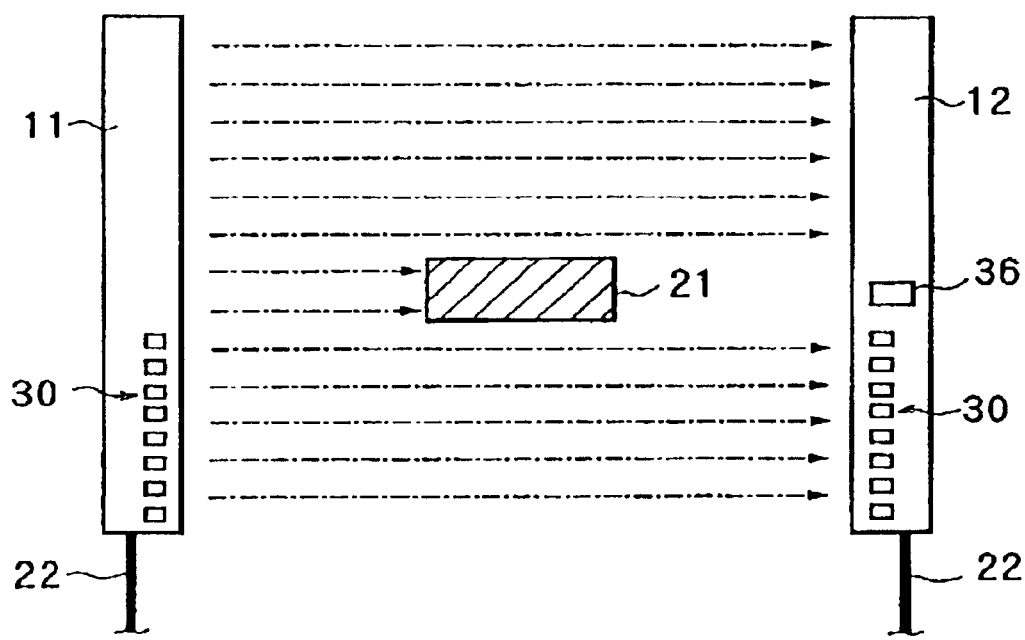
FIG. 23 is a diagram for explaining the second step of procedures according to the invention for optical axis adjustment of the light emitting and detecting devices of the multi-beam photoelectric safeguard system.

Second Step: Mounting of the Projecting Portion 21 (FIG. 23)

After completion of the first step, the projecting portion is mounted to the press 20. As a result, some of the optical axes between the main light emitting and detecting devices 11, 12 are interrupted.

Third Step: Generation of the Multi-detection Operation Mode (FIG. 21)

The operator or user next turns ON the teaching switch 36 (step S1 of FIG. 21). As a result, the safeguard system 100 or 200 enters in the teaching mode for automatically generating the multi-detection or modified operation sequence that determines emitting/detecting operations not only of the main light emitting and detecting devices 11, 12 but also of the sub light detecting and emitting devices 13, 14 in the multi-detection mode. The ON signal from the teaching switch 36 is input into the photodetector control circuit 54.

Once the system enters in the teaching mode, the photodetector control circuit 54 having acknowledged the teaching mode transfers the information to the LED control circuit 43 through the communication line or signal line 22, and the main light emitting device 11 starts emission according to the basic operation sequence shown in FIG. 14 (step S2 of FIG. 21).

When all LEDs of the main light emitting device 11 complete emission of light, the photo detector control circuit 54 recognizes that the third and fourth optical axis, in case of the example shown in FIG. 7, are interrupted by the projecting portion 21. Responsively, in case of generating the multi-detection operation sequence or modified operation sequence, the photodetector control circuit 54 makes a first blank (a length of time totaling the time T1 and the time T2) necessary for activation of one of LEDs of the sub light emitting device 14 for the third optical axis (illustrated as the optical axis No. 3' in FIG. 15) after the activation timing of one of LEDs of the main light emitting device 11 for the third axis (illustrated as the optical axis No. 3 in FIG. 15) while delaying activation timings of LEDs for subsequent optical axes. Additionally, the photodetector control circuit 54 makes a second blank (a length of time totaling the time T1 and the time T2) necessary for activation of the other LED of the sub light emitting device 14 for the fourth optical axis (illustrated as the optical axis No. 4' in FIG. 15) after the activation timing of one of LEDs of the main light emitting device 11 for the fourth axis (illustrated as the optical axis No. 4 in FIG. 15) while delaying emission timings of LEDs for subsequent optical axes. Furthermore, the photodetector control circuit 54 incorporates timings for activation of the sub light emitting device 14 in the first and second blanks. In this manner, the photodetector control circuit 54 automatically generates the modified operation sequence shown in FIG. 15 for activating the sub light emitting device 14 as well at the timings corresponding to the first and second blanks. Hereinbelow, optical axes interrupted by the projecting portion 21 are called planking optical axis.

Alternatively, if the multi-detection operation sequence or modified operation sequence of FIG. 16 should be generated, the photodetector control circuit 54 may make the first and second blanks necessary for activation of LEDs of the sub light emitting device 14 between activation timings of LEDs of the main light emitting device 11 for the eighth and first optical paths, and may automatically generate the sequence for activating the sub light emitting device 14 at the timings corresponding to the first and second blanks.

As a result, the multi-detection operation sequence or modified operation sequence as shown in FIG. 15 or 16 is automatically generated (step S4 of FIG. 21), and the teaching mode ends (step S5 of FIG. 21).

In the process explained above, the photodetector control circuit 54 that can be regarded as CPU of the main light emitting device 12 recognizes the ON state of the teaching switch 36, and the photodetector control circuit 54 automatically generates the modified operation sequence (FIG. 15 or 16) in response to detection of interruption of particular optical axes. However, this function may be given to the photodetector control circuit 43 of the main light emitting device 11 so that the modified operation sequence is established on the part of the main light emitting device 11. Alternatively, it is of course possible that the main light emitting device 11 and the main light detecting device 12 share the function of automatically generating the modified operation sequence.

Figure 24:
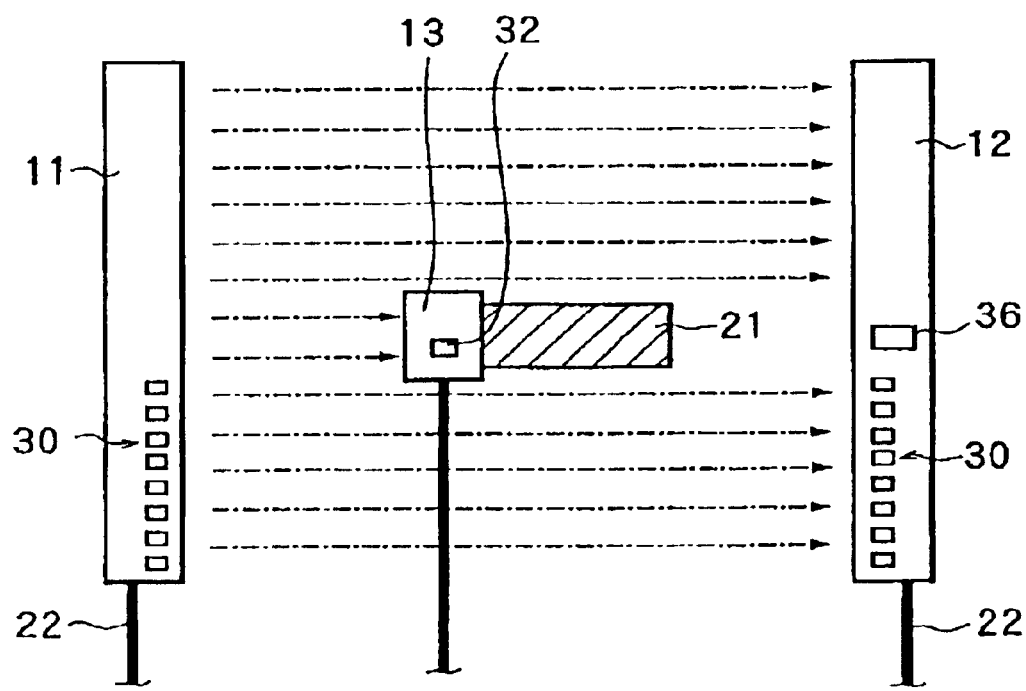
FIG. 24 is a diagram for explaining the fourth step of procedures according to the invention for optical axis adjustment of the light emitting and detecting devices of the multi-beam photoelectric safeguard system.

Fourth Step: Setting and Positioning of the Sub Light Detecting Device 13 (FIG. 24)

The sub light detecting device 13 is placed adjacent to one side of the projecting portion in an opposed relationship with the main light emitting device 11. For accurate positioning of the sub light detecting device 13 relative to the main light emitting device 11, it will be necessary to move the sub light detecting device 13 vertically or change its orientation such that optical axes coincide between the sub light detecting device 13 and the main light emitting device 11.

Since the modified operation sequence is already established in the third step 3 such that the sub light detecting device 13 is activated at given timings for detecting light beams only of the third and fourth optical axes, in case of the example of FIG. 7, from the main light emitting device, the operator can accomplish positioning of the sub light detecting device 13 relative to the main light emitting device 11 by moving the former while confirming the degree of adjustment through the optical axis adjustment display or display lamp 32 on the sub light detecting device 13 or the optical axis adjustment display 39.

Fifth Step: Setting and Positioning of the Sub Light Emitting Device 14 (FIG. 25)

The sub light emitting device 14 is next placed adjacent to the opposite side of the projecting portion 21 in an opposed relationship with the main light detecting device 12. Here again, for accurate positioning of the sub light emitting device 14 relative to the main light detecting device 12, it will be necessary to slightly move the sub light emitting device 14 vertically or change its orientation such that, in case of the example of FIG. 7, light beams emitted from the sub light emitting device 14 are detected by photodetectors of the main light detecting device for the third and fourth optical axes. The operator can proceed with this adjustment while confirming the degree of adjustment through the optical axis adjustment display on the sub light emitting device 14 or the optical axis adjustment display 39 on the controller 38. Thus the adjustment of optical axes between the sub light emitting device 14 and the main light detecting device 12 is accomplished.

Sixth Step: Confirmation of Detection of the Minimum Object (FIG. 26)

Next confirmed is whether the system 100 or 200 can detect a certain minimum object in any of the detection areas defined by the main light emitting and detecting devices 11, 12 and the sub light detecting and emitting devices 13, 14. The operator can carry out this confirmation by moving a minimum object (not shown) to be detected along the route shown by arrows in FIG. 26 and confirming that a blockage signal is output from the system 100 or 200 when the object intrudes into the detection areas.

Figure 27:
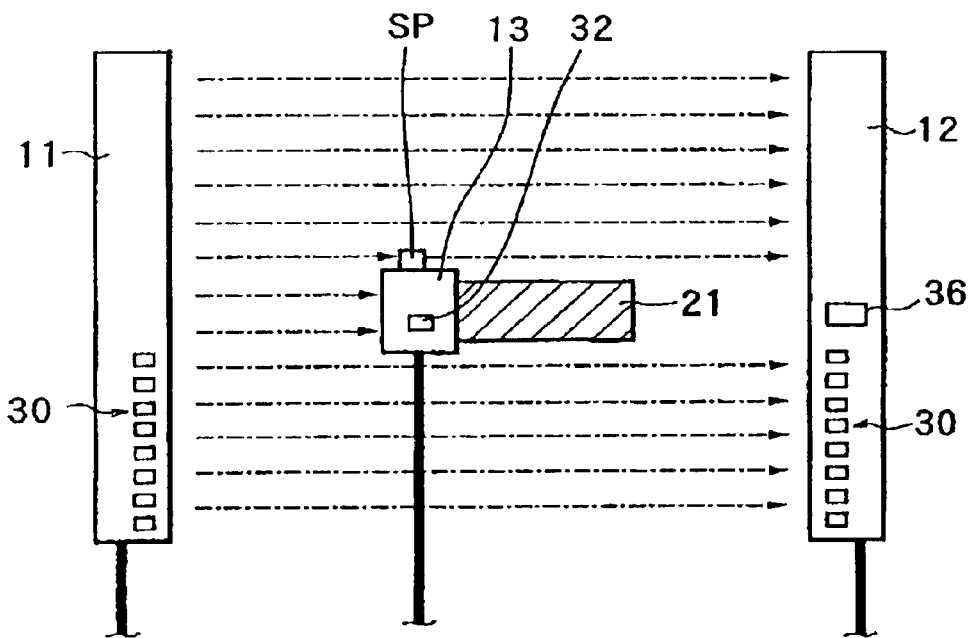
FIG. 27 is a diagram for explaining a spacer preferably used in the fourth step of procedures according to the invention for optical axis adjustment of the light emitting and detecting devices of the multi-beam photoelectric safeguard system.

For the positioning of the sub light detecting device 13 in the fourth step, it is convenient to removably attach a spacer SP on the top and/or bottom of the sub light detecting device 13 as shown in FIG. 27. The spacer SP may be a plate member, for example, which does not interrupt light beams of adjacent optical axes (in the example of FIG. 7, second and fifth optical axes) when the sub light detecting device 13 is accurately positioned, but does interrupt the adjacent light beams when the sub light detecting device 13 is offset vertically, even if slightly.

In another example, the spacer SP may be a plate having a small through hole, not shown. The operator can accurately position the sub light detecting device 13 by finding its position where the light beam of the second or fifth optical axis passes through the hole of the plate. In other words, when the sub light detecting device is offset vertically or in the front and back direction, even if slightly, the light beam of the second or fifth optical axis will be interrupted by the spacer SP having the through hole.

Figure 28:
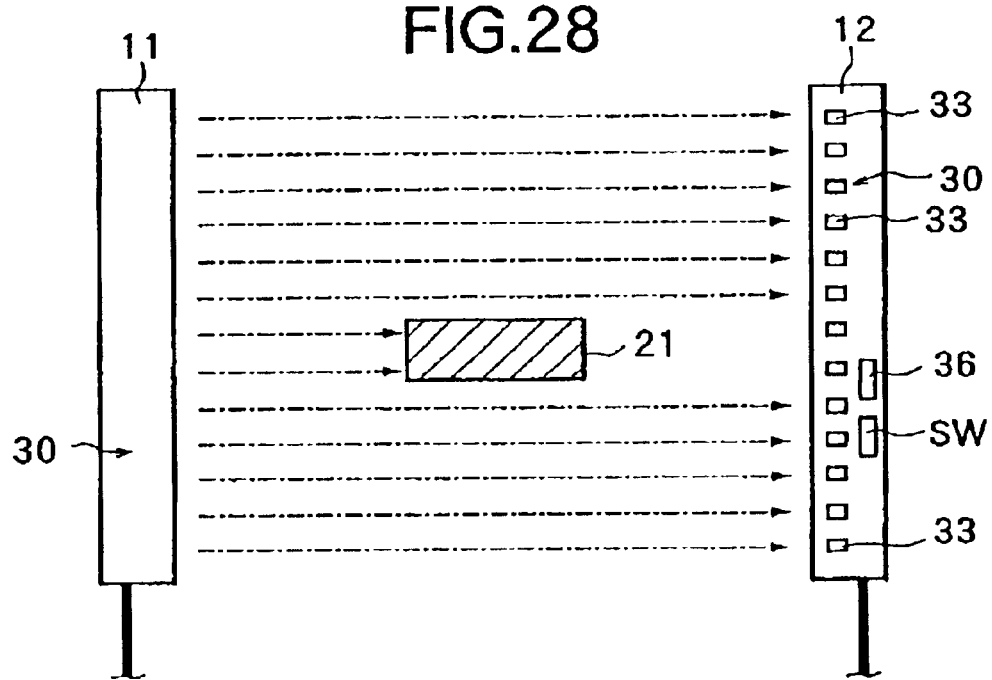
FIG. 28 is a diagram for explaining the first step of alternative procedures according to the invention for optical axis adjustment of light emitting and detecting devices of a multi-axis photoelectric safeguard system.

For the above-explained adjustment of optical axes of the light emitting and detecting devices provided in the safeguard system 100 or 200, the projecting portion 21 is removed from the press 20 in the process of adjusting the optical axes of the main light emitting and detecting devices 11, 12. However, as shown in FIG. 28, relative accurate positioning between the main light emitting and detecting devices 11, 12, namely, adjustment of their optical axes, may be carried out under the existence of the projecting portion 21 on the press 20.

In this case, adjustment of optical axes is carried out by positioning the main light emitting and detecting devices 11, 12 to ensure that all light beams other than those of the optical axes interrupted by the projecting portion 21 (the third and fourth optical axes in the foregoing example) enter into the main light detecting device 12. The operator will confirm through the optical axis adjustment displays or display lamps 30 on the main light emitting device 11 and the main light detecting device 12 or the optical axis adjustment display 39 on the controller 38 whether the adjustment of optical axes has been accomplished or not. However, for easier confirmation, it is advantageous to provide a switch SW shown in FIG. 28 on the main light detecting device 12, main light emitting device 11 and/or controller 38 such that the operator can confirm the intensities of detected light of individual optical axes through the optical axis adjustment display 30 or 39 by manipulating the switch SW. The optical axis display device 30 may be of the type having display lamps 33 exclusive for individual optical axes (FIG. 28), or in form of the numerical display 34 using a liquid crystal or seven segments of LEDs as shown in FIG. 10. The numerical display 34 may have some different display modes for selectively representing the number of optical axes of detected light beams, number of interrupted optical axes, position of an interrupted optical axis, and so on, such that, for example, the position of the optical axis currently interrupted on the numerical display 34 under the operator's choice to confirm whether positioning of the main light emitting and detecting devices 11, 12 has been accomplished or not.

Although the modified example of optical axis adjustment has been roughly explained with reference to FIG. 28, its procedures and automatic generation of the multi-detection sequence or modified operation sequence responsive to the instruction through the teaching switch 36 will follow the following steps.

First Step: Setting and Positioning of the Main Light Emitting and Detecting Devices 11, 12 Relative to the Press 20 Having the Protecting Portion 21 (FIG. 28)

The main light emitting device 11 and the main light detecting device 12 are accurately positioned relative to each other (See FIG. 22). More specifically, the main light emitting and detecting devices 11, 12 are placed at spaced-apart positions from the projecting portion 21 of the press 20 at opposite sides thereof, and their optical axes are adjusted accurately. This adjustment of optical axes is achieved by fine adjustment of the main light emitting and detecting devices 11, 12 so as to accurately align their optical axes. The operator can confirm whether the main light detecting device 12 has detected all optical beams sequentially emitted from LEDs of the main light emitting device 11 are certainly detected, that is, whether the main light emitting and detecting devices 11 12 have been precisely positioned relative to each other, by watching the optical axis adjustment displays or display lamps 30 on the main light emitting and detecting devices 11, 12, or the optical axis adjustment display on the controller 38.

Second Step: Generation of the Multi-detection Operation Sequence (FIG. 21)

The operator or user next turns ON the teaching switch 36 (step S1 of FIG. 21). As a result, the safeguard system 100 or 200 enters in the teaching mode for automatically generating the multi-detection or modified operation sequence that determines emitting/detecting operations not only of the main light emitting and detecting devices 11, 12 but also of the sub light detecting and emitting devices 13, 14 in the multi-detection mode. The ON signal from the teaching switch 36 is input into the photodetector control circuit 54.

Once the system enters in the teaching mode, as already explained, the photodetector control circuit 54 having acknowledged the teaching mode transfers the information to the LED control circuit 43 through the communication line or signal line 22, and the main light emitting device 11 starts emission according to the basic operation sequence shown in FIG. 14 (step S2 of FIG. 21).

When all LEDs of the main light emitting device 11 complete emission of light, the photo detector control circuit 54 recognizes that the third and fourth optical axis, in case of the example shown in FIG. 7, are interrupted by the projecting portion 21. Responsively, assuming here again that the multi-detection operation sequence should be generated, the photodetector control circuit 54 makes a first necessary for activation of one of LEDs of the sub light emitting device 14 for the third optical) after the activation timing of one of LEDs of the main light emitting device 11 for the third axis while delaying activation timings of LEDs for subsequent optical axes. Additionally, the photodetector control circuit 54 makes a second blank necessary for activation of the other LED of the sub light emitting device 14 for the fourth optical axis after the activation timing of one of LEDs of the main light emitting device 11 for the fourth axis while delaying emission timings of LEDs for subsequent optical axes. Furthermore, the photodetector control circuit 54 incorporates timings for activation of the sub light emitting device 14 in the first and second blanks. In this manner, the photodetector control circuit 54 automatically generates the modified operation sequence shown in FIG. 15 for activating the sub light emitting device 14 as well at the timings corresponding to the first and second blanks. Hereinbelow, optical axes interrupted by the projecting portion 21 are called planking optical axis. Also when the multi-detection operation sequence of FIG. 16 should be made, its procedures are the same as those already explained.

As a result, as already explained, the multi-detection operation sequence or modified operation sequence as shown in FIG. 15 or 16 is automatically generated (step S4 of FIG. 21), and the teaching mode ends (step S5 of FIG. 21).

Third Step: Setting and Positioning of the Sub Light Detecting Device 13 (FIG. 24)

In the same manner as the embodiment already explained, the sub light detecting device 13 is placed adjacent to one side of the projecting portion in an opposed relationship with the main light emitting device 11. For accurate positioning of the sub light detecting device 13 relative to the main light emitting device 11, it will be necessary to move the sub light detecting device 13 vertically or change its orientation such that optical axes coincide between the sub light detecting device 13 and the main light emitting device 11.

Since the modified operation sequence is already established in the third step 3 such that the sub light detecting device 13 is activated at given timings for detecting light beams only of the third and fourth optical axes, in case of the example of FIG. 7, from the main light emitting device, the operator can accomplish positioning of the sub light detecting device 13 relative to the main light emitting device 11 by moving the former while confirming the degree of adjustment through the optical axis adjustment display or display lamp 32 on the sub light detecting device 13 or the optical axis adjustment display 39.

Fourth Step: Setting and Positioning of the Sub Light Emitting Device 14 (FIG. 25)

In the same manner as the embodiment already explained with reference to FIG. 25, the sub light emitting device 14 is next placed adjacent to the opposite side of the projecting portion 21 in an opposed relationship with the main light detecting device 12. Here again, for accurate positioning of the sub light emitting device 14 relative to the main light detecting device 12, it will be necessary to slightly move the sub light emitting device 14 vertically or change its orientation such that, in case of the example of FIG. 7, light beams emitted from the sub light emitting device 14 are detected by photodetectors of the main light detecting device for the third and fourth optical axes. The operator can proceed with this adjustment while confirming the degree of adjustment through the optical axis adjustment display on the sub light emitting device 14 or the optical axis adjustment display 39 on the controller 38. Thus the adjustment of optical axes between the sub light emitting device 14 and the main light detecting device 12 is accomplished.

Fifth Step: Confirmation of Detection of the Minimum Object (FIG. 26)

In the same manner as already explained with reference to FIG. 26, next confirmed is whether the system 100 or 200 can detect a certain minimum object in any of the detection areas defined by the main light emitting and detecting devices 11, 12 and the sub light detecting and emitting devices 13, 14. The operator can carry out this confirmation by moving a minimum object (not shown) to be detected along the route shown by arrows in FIG. 26 and confirming that a blockage signal is output from the system 100 or 200 when the object intrudes into the detection areas.

In the foregoing explanation, optical axes interrupted by the projecting portion 21 are identified in the positioning step of the main light emitting and detecting devices 11, 12. If, however, the operator can identify the interrupted axes, i.e. the blanking optical axes beforehand, the operator may supply the information to the system 100 or 200 through an external means. Similarly, the multi-detection operation sequence or modified operation sequence (FIG. 15) may be generated outside the system 100 or 200, and this information may be supplied together with the information about the blanking optical axes to the system 100 or 200 through a communication means using infrared rays or electric waves, USB, Ethernet, or the like. Any skilled person in the art will readily understand that the operator can easily generate the multi-detection sequence or modified operational sequence (FIG. 15) by using a personal computer, for example, and inputting ID numbers of the blanking axes to the computer.

Once the positioning (optical axis adjustment) of the light emitting and detecting devices is accomplished, the safeguard system 100 or 200 behaves according to the modified operation sequence shown in FIG. 15 or 16 to sequentially emit and detect light from the first optical axis to the eighth optical axis, and repeats this cycle of optical scan again from the first optical axis. In each cycle of the operation, the sub light detecting device 13 is activated in sync with activation of the third and fourth optical axes of the main light emitting device 11 thereby to selectively change each corresponding photodetector thereof active. Each photodetector of the main light detecting device 12 is selectively activated in sync with operations of the main light emitting device 11 and the sub light emitting devices 14. As a result, as to the third and fourth optical axes, the sub light detecting device 13 detects light beams from the main light emitting device 11, and the main light detecting device 12 detects light beams from the sub light emitting device 14.

That is, in the sub light detecting device 13, photodetectors are selectively activated in synch with activation of LEDs of the corresponding third and fourth optical axis of the main light emitting device 11 according to the modified operation sequence (FIG. 15 or 16). When each photodetector of the sub light detecting device 13 detects light beam from the main light emitting device 11, the sub light detecting device 13 supplies an emission command to the sub light emitting device 14 directly or via the controller 38.

When the sub light emitting device 14 receives the information from the sub light detecting device 13 or controller 38 according to the modified operation sequence (FIG. 15 or 16) automatically generated by the initial setting, one of LEDs of the sub light emitting device 14 for the corresponding optical axis is changed active. The sub light emitting device 14 may be controlled otherwise such that it emits a light beam exclusively following to the modified sequence of FIG. 15 or 16 without the emission command from the sub light detecting device 13 or controller 38, or it emits a light beam exclusively following to the emission command from the sub light detecting device 13 or controller 38.

Although some embodiments of the invention have been explained taking examples in witch the safeguard system 100 or 200 includes a set of main light emitting and detecting devices 11, 12, one sub light detecting device 13 and one sub light emitting device 14, the safe guard system 100 or 200 may include two or more sets of sub light detecting and emitting devices 13, 14, and in addition to that, the system 100 or 200 may include two or more sets of main light emitting and detecting devices 11, 12 that are connected by a communication line or signal line to make a wider light curtain.

Although some embodiments have been explained as providing the optical adjustment displays or display lamps 30 on both the main light emitting and detecting devices 11, 12, they may be modified to provide the optical axis adjustment display or display lamp 30 on one of the main light emitting and detecting devices.

Also regarding the sub light detecting and emitting devices 13, 14, the optical axis adjustment display or display lamp 32 may be provided on only of the sub light detecting and emitting devices 13, 14. In this case, the optical axis adjustment display or display lamp 32 is preferably provided on the sub light detecting device 13. Optical axis adjustment of the sub light detecting and emitting devices 13, 14 may be confirmed through the optical axis adjustment display 39 of the controller 38.

Furthermore, while the system 100 or 200 actually works after installation and optical axis adjustment of the light emitting and detecting devices 11 through 14 according the method explained heretofore, if the light emitting and detecting devices 11 to 14 again need optical axis adjustment as the maintenance of the system 100 or 200, the operator may proceed with substantially the same procedures as explained above. In this case, the operator may first adjust optical axes between the main light emitting and detecting devices, or may first adjust optical axes between the sub light detecting and emitting devices prior to adjustment of the main light emitting and detecting devices.

What is claimed is:

1. A method of installing a multi-beam photoelectric safeguard system for making a light curtain with a number of light beams around an interfering object, said multi-beam photoelectric safeguard system including:

a main light emitting device having a plurality of light emitting elements aligned in an array at equal intervals;

a main light detecting device disposed in an opposed relationship with said main light emitting device and having a plurality of photodetectors equal in number to said light emitting elements and arranged in an array at regular intervals;

a sub light detecting device disposed adjacent to one side of said interfering object interrupting a light beam of at least one optical axis of said light curtain, and including at least one photodetector capable of detecting a light beam from said main light emitting device;

a sub light emitting device disposed adjacent to the other side of said interfering object and capable of emitting a light beam toward said main light detecting device; and said light curtain including a main detection area defined between said main light emitting device and said main light detecting device, a first sub detection area defined between said main light emitting device and said sub light detecting device, and a second sub detection area defined between said sub light emitting device and said main light detecting device, said method comprising:

(a) positioning said main light emitting device and said main light detecting device relative to each other and identifying a blanking optical axis interrupted by said interfering object among said light beams between said main light emitting device and said main light detecting device;

(b) placing said sub light detecting device adjacent to one side of said interfering object and thereafter positioning same relative to said main light emitting device by moving said sub light detecting device; and (c) placing said sub light emitting device adjacent to the other side of said interfering object and thereafter positioning same relative to said main light detecting device by moving said sub light emitting device.

2. A method according to claim 1 wherein said step (a) includes:

positioning said main light emitting device and said main light detecting device under a condition without said interfering object; and thereafter mounting said interfering object between said main light emitting device and said main light detecting device.

3. A method according to claim 1 wherein said step (a) includes:

positioning said main light emitting device and said main light detecting device in opposite sides of said interfering object under existence thereof.

4. The method according to claim 1 wherein an optical adjustment display lamp is provided on at least one of said man light emitting device and said main light detecting device.

5. The method according to claim 1 wherein said sub light detecting device and said sub light emitting device include optical axis adjustment display means.

6. The method according to claim 1 wherein identification of said blanking optical axis in said step (a) is carried out by supplying information about said blanking optical axis from an operator.

7. The method according to claim 1 wherein said main light emitting device and said main light detecting device operate according to a basic operation sequence which permits sequential emission and detection of light for a predetermined length or time.

8. The method according to claim 7 further comprising after said step (a):

generating a modified operation sequence additionally determining operations of said sub light detecting and emitting devices on the basis of said blanking optical axis identified.

9. The method according to claim 1 wherein said step (b) is executed using a spacer attached to said sub light detecting device and configured to interrupt light beams of optical axes adjacent to said blanking optical axis when said sub light detecting device is offset from the proper position thereof.

10. A method of installing a multi-beam photoelectric safeguard system, comprising:

preparing a main light emitting device having a plurality of light emitting elements aligned at equal intervals;

preparing a main light detecting device having a plurality of photodetectors equal in number to said light emitting elements and capable of detecting light beams from said main light emitting device;

positioning said main light emitting device and said main light detecting device at predetermined positions in an opposed relationship;

adjusting optical axes between said main light emitting device and said main light detecting device by relatively moving at least one of same;

mounting an interfering object which interrupts a light curtain made by said main light emitting device and said main light detecting device;

setting a sub light detecting device having at least one photodetector at one side of said interfering object;

adjusting optical axes between said sub light detecting device and said main light emitting device by moving said sub light detecting device;

setting a sub light emitting device having at least one light emitting element at the other side of said interfering object; and adjusting optical axes between said sub light emitting device and said main light detecting device by moving said sub light emitting device.

11. A method of adjusting optical axes of a multi-beam photoelectric safeguard system which includes: a main light emitting device and a main light detecting device disposed in an opposed relationship; a sub light detecting device which is disposed adjacent to an interfering object interfering a plane defined between said main light emitting device and said main light detecting device and is opposed to said main light emitting device; and a sub light emitting device adjacent to said interfering object and opposed to said main light detecting device, comprising:

adjusting optical axes between said main light emitting device and said main light detecting device by relatively moving same;

next adjusting optical axes between said main light emitting device and said sub light detecting device by moving said sub light detecting device; and next adjusting optical axes between said sub light emitting device and said main light detecting device by moving said sub light emitting device.

12. A method of adjusting optical axes of a multi-beam photoelectric safeguard system which includes: a main light emitting device and a main light detecting device disposed in an opposed relationship; a sub light detecting device which is disposed adjacent to an interfering object interfering a plane defined between said main light emitting device and said main light detecting device and is opposed to said main light emitting device; and a sub light emitting device adjacent to said interfering object and opposed to said main light detecting device, comprising:

adjusting optical axes between said main light emitting device and said main light detecting device by relatively moving same;

next adjusting optical axes between said sub light emitting device and said main light detecting device by moving said sub light emitting device; and next adjusting optical axes between said main light emitting device and said sub light detecting device by moving said sub light detecting device.

13. A method of installing a multi-beam photoelectric safeguard system, comprising:

preparing a main light emitting device having a plurality of light emitting elements aligned at equal intervals;

preparing a main light detecting device having a plurality of photodetectors equal in number to said light emitting elements and capable of detecting light beams from said main light emitting device;

positioning said main light emitting device and said main light detecting device in an opposed relationship at predetermined positions in opposite sides of an interfering object;

adjusting optical axes between said main light emitting device and said main light detecting device by relatively moving at least one of same;

setting a sub light detecting device having at least one photodetector at one side of said interfering object;

adjusting optical axes between said sub light detecting device and said main light emitting device by moving said sub light detecting device;

setting a sub light emitting device having at least one light emitting element at the other side of said interfering object; and adjusting optical axes between said sub light emitting device and said main light detecting device by moving said sub light emitting device.

* * * * *